(12) United States Patent
Hirose et al.

(10) Patent No.: US 9,698,416 B2
(45) Date of Patent: *Jul. 4, 2017

(54) ANODE AND SECONDARY BATTERY WITH ANODE MATERIAL WITH PORE GROUP WITH LOW VOLUMETRIC CAPACITY

(71) Applicant: Sony Corporation, Tokyo (JP)

(72) Inventors: Takakazu Hirose, Fukushima (JP); Kenichi Kawase, Fukushima (JP); Isamu Konishiike, Fukushima (JP); Shunsuke Kurasawa, Fukushima (JP); Masayuki Iwama, Fukushima (JP); Koichi Matsumoto, Fukushima (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/943,258

(22) Filed: Nov. 17, 2015

(65) Prior Publication Data

US 2016/0072126 A1 Mar. 10, 2016

Related U.S. Application Data

(63) Continuation of application No. 12/133,000, filed on Jun. 4, 2008, now abandoned.

(30) Foreign Application Priority Data

Jun. 5, 2007 (JP) .................................. 2007-149253
Jan. 25, 2008 (JP) .................................. 2008-015256

(51) Int. Cl.
*H01M 4/58* (2010.01)
*H01M 4/38* (2006.01)
(Continued)

(52) U.S. Cl.
CPC ........... *H01M 4/386* (2013.01); *H01M 2/022* (2013.01); *H01M 2/0217* (2013.01);
(Continued)

(58) Field of Classification Search
CPC ...... H01M 4/386; H01M 4/045; H01M 4/134; H01M 4/1395; H01M 4/362; H01M 4/366;
(Continued)

(56) References Cited

U.S. PATENT DOCUMENTS 5,698,339 A * 12/1997 Kawakami ............. H01M 4/13
427/201
8,669,012 B2 * 3/2014 Hirose .................. H01M 4/134
429/209
(Continued)

FOREIGN PATENT DOCUMENTS

JP 11-339777 12/1999
JP 11-339778 12/1999
(Continued)

*Primary Examiner* — Raymond Alejandro
(74) *Attorney, Agent, or Firm* — Dentons US LLP

(57) ABSTRACT

A battery capable of improving cycle characteristics is provided. An anode includes: an anode current collector, and an anode active material layer arranged on the anode current collector, in which the anode active material layer includes an anode active material including silicon (Si), and including a pore group with a diameter ranging from 3 nm to 50 nm both inclusive, and the volumetric capacity per unit weight of silicon of the pore group with a diameter ranging from 3 nm to 50 nm both inclusive is 0.2 $cm^3/g$ or less, the volumetric capacity being measured by mercury porosimetry using a mercury porosimeter.

20 Claims, 14 Drawing Sheets

(51) Int. Cl.
*H01M 4/134* (2010.01)
*H01M 4/1395* (2010.01)
*H01M 4/36* (2006.01)
*H01M 6/16* (2006.01)
*H01M 10/0525* (2010.01)
*H01M 10/0568* (2010.01)
*H01M 10/0569* (2010.01)
*H01M 2/02* (2006.01)
*H01M 4/04* (2006.01)
*H01M 4/48* (2010.01)
*H01M 4/02* (2006.01)

(52) U.S. Cl.
CPC ........ *H01M 4/045* (2013.01); *H01M 4/134* (2013.01); *H01M 4/1395* (2013.01); *H01M 4/362* (2013.01); *H01M 4/366* (2013.01); *H01M 4/38* (2013.01); *H01M 6/164* (2013.01); *H01M 10/0525* (2013.01); *H01M 10/0568* (2013.01); *H01M 10/0569* (2013.01); H01M 2/0257 (2013.01); H01M 4/0404 (2013.01); H01M 4/049 (2013.01); H01M 4/483 (2013.01); H01M 2004/021 (2013.01); H01M 2004/027 (2013.01); H01M 2220/30 (2013.01); H01M 2300/0034 (2013.01); Y02E 60/122 (2013.01)

(58) Field of Classification Search
CPC .... H01M 4/0404; H01M 4/049; H01M 4/483; H01M 2/0217; H01M 2/022; H01M 2/0257; H01M 10/0525; H01M 10/0568; H01M 10/0569; H01M 2004/021; H01M 2004/027; H01M 2220/30; H01M 2300/0034; Y02E 60/122
See application file for complete search history.

(56) References Cited

U.S. PATENT DOCUMENTS

| | | | |
|---|---|---|---|
| 2006/0110662 A1* | 5/2006 | Konishiike | H01M 4/134 429/233 |
| 2006/0286439 A1* | 12/2006 | Fujikawa | H01M 2/1653 429/62 |
| 2007/0012574 A1* | 1/2007 | Rauh-Adelmann | C25D 11/32 205/175 |
| 2008/0176143 A1 | 7/2008 | Inada et al. | |
| 2009/0035651 A1* | 2/2009 | Hirose | H01M 4/134 429/164 |
| 2010/0216036 A1* | 8/2010 | Shima | H01M 10/0525 429/338 |

FOREIGN PATENT DOCUMENTS

| | | |
|---|---|---|
| JP | 2000-36323 | 2/2000 |
| JP | 2004-071305 | 3/2004 |
| JP | 2004-319469 | 11/2004 |
| JP | 2005-293899 | 10/2005 |

\* cited by examiner

ANODE AND SECONDARY BATTERY WITH ANODE MATERIAL WITH PORE GROUP WITH LOW VOLUMETRIC CAPACITY

CROSS REFERENCES TO RELATED APPLICATIONS

This application is a continuation of U.S. patent application Ser. No. 12/133,000 filed Jun. 4, 2008, abandoned, the entirety of which is incorporated herein by reference to the extent permitted by law. The present invention contains subject matter related to Japanese Patent Application JP 2007-149253 filed in the Japanese Patent Office on Jun. 5, 2007 and Japanese Patent Application JP 2008-015256 filed in the Japanese Patent Office on Jan. 25, 2008, the entire contents of which are incorporated herein by references.

BACKGROUND OF THE INVENTION

1. Field of the Invention

The present invention relates to an anode including an anode current collector and an anode active material layer arranged on the anode current collector, and a secondary battery including the anode.

2. Description of the Related Art

In recent years, portable electronic devices such as camera-integrated VTRs (videotape recorders), cellular phones, or laptop computers are widely used, and size and weight reduction in the portable electronic devices and an increase in longevity of the portable electronic devices have been strongly demanded. Accordingly, as power sources for the portable electronic devices, the development of batteries, specifically lightweight secondary batteries capable of obtaining a high energy density have been promoted. Among them, a secondary battery (a so-called lithium-ion secondary battery) using insertion and extraction of lithium for charge-discharge reaction holds great promise, because the secondary battery is capable of obtaining larger energy density, compared to a lead-acid battery or a nickel-cadmium battery.

The lithium-ion secondary battery includes a cathode, an anode and an electrolytic solution, and the anode has a configuration in which an anode active material layer including an anode active material is arranged on an anode current collector. As the anode active material, a carbon material is widely used; however, recently with enhancement of performance and expansion of functions in portable electronic devices, a further improvement in battery capacity is desired, so it is considered to use silicon instead of a carbon material. It is because the theoretical capacity of silicon (4199 mAh/g) is much larger than the theoretical capacity of graphite (372 mAh/g), so an increase in battery capacity is expected.

However, when silicon is deposited as the anode active material by a vapor-phase method, a large number of pores are formed in the anode active material to increase the surface area of the anode active material. In this case, the anode active material has high activity, so an electrolytic solution is easily decomposed during charge and discharge, and lithium is easily inactivated. Thereby, while the secondary battery obtains a higher capacity, cycle characteristics which are important characteristics of the secondary battery easily decline.

Therefore, to improve cycle characteristics even in the case where silicon is used as the anode active material, various ideas have been made.

More specifically, a technique in which in the case where the deposition of a silicon thin film is performed a plurality of times by a vapor-phase method, ions are applied to a surface of the silicon thin film before the second or later deposition steps (for example, refer to Japanese Unexamined Patent Application Publication No. 2005-293899), a technique in which an anode current collector having a three-dimensional configuration such as foam metal or a sintered fiber metal body is used (for example, refer to Japanese Unexamined Patent Application Publication No. 2004-071305), or a technique in which silicon is sintered to be integrated with an anode current collector (for example, refer to Japanese Unexamined Patent Application Publication Nos. H11-339777 and H11-339778) or the like has been proposed.

Moreover, a technique in which silicon particles are coated with a fired body (ceramic) such as a metal oxide (for example, refer to Japanese Unexamined Patent Application Publication Nos. 2004-335334 and 2004-335335), a technique in which an oxide layer such as silicon oxide is formed on a surface of a silicon alloy layer (for example, refer to Japanese Unexamined Patent Application Publication No. 2004-319469), a technique in which a conductive metal is reductively deposited on silicon powder (for example, refer to Japanese Unexamined Patent Application Publication No. H11-297311), a technique in which silicon compound particles are coated with a metal (for example, refer to Japanese Unexamined Patent Application Publication No. 2000-036323), a technique in which a metal element not alloyed with lithium is dispersed in silicon particles (for example, refer to Japanese Unexamined Patent Application Publication No. 2001-273892), a technique in which copper is dissolved into a silicon thin film (for example, refer to Japanese Unexamined Patent Application Publication No. 2002-289177) or the like has been proposed.

SUMMARY OF THE INVENTION

As recent portable electronic devices have a smaller size, higher performance and more functions, secondary batteries tend to be frequently charged and discharged accordingly, thereby cycle characteristics easily decline. In particular, in a lithium-ion secondary battery using silicon as an anode active material to increase the capacity, cycle characteristics are noticeably prone to decline due to the above-described increase in surface area. Therefore, further improvement in cycle characteristics of the secondary battery is desired.

In view of the foregoing, it is desirable to provide an anode and a secondary battery which are capable of improving cycle characteristics.

According to an embodiment of the invention, there is provided an anode including: an anode current collector; and an anode active material layer arranged on the anode current collector, in which the anode active material layer includes an anode active material including silicon, and including a pore group with a diameter ranging from 3 nm to 50 nm both inclusive, and the volumetric capacity per unit weight of silicon of the pore group with a diameter ranging from 3 nm to 50 nm both inclusive is 0.2 $cm^3/g$ or less, the volumetric capacity being measured by mercury porosimetry using a mercury porosimeter.

According to an embodiment of the invention, there is provided a secondary battery including a cathode, an anode and an electrolytic solution, in which the anode includes an anode current collector and an anode active material layer arranged on the anode current collector, the anode active material layer includes an anode active material including silicon, and including a pore group with a diameter ranging from 3 nm to 50 nm both inclusive, and the volumetric capacity per unit weight of silicon of the pore group with a diameter ranging from 3 nm to 50 nm both inclusive is 0.2 cm$^3$/g or less, the volumetric capacity being measured by mercury porosimetry using a mercury porosimeter.

The above-described "volumetric capacity of a pore group" is determined by replacing the amount of mercury intruded which is measured by mercury porosimetry using a mercury porosimeter with the volumetric capacity of the small pore group. Thereby, "the capacity of a pore group with a diameter ranging from 3 nm to 50 nm both inclusive" is determined by replacing the measured total amount of mercury intruded into pores with a diameter ranging from 3 nm to 50 nm both inclusive with the volumetric capacity of a pore group with a diameter of the same range. Moreover, "the capacity of a pore group with a diameter ranging from 3 nm to 20 nm both inclusive" is determined by replacing the measured total amount of mercury intruded into pores with a diameter ranging from 3 nm to 20 nm both inclusive with the volumetric capacity of a pore group with a diameter of the same range. The amount of mercury intruded is a value measured under conditions that the surface tension and the contact angle of mercury are 485 mN/m and 130°, respectively, and a relationship between the diameter of a pore and pressure is approximate to 180/pressure=diameter. The volumetric capacity (cm$^3$/g) of a pore group per unit weight of silicon is able to be calculated from the weight (g) of silicon and the amount of mercury intruded (=the capacity of a pore group: cm$^3$).

In the anode according to the embodiment of the invention, the anode active material includes silicon, and includes a pore group with a diameter ranging from 3 nm to 50 nm both inclusive, and the volumetric capacity of the pore group with a diameter ranging from 3 nm to 50 nm per unit weight of silicon which is measured by mercury porosimetry using a mercury porosimeter is 0.2 cm$^3$/g or less, so compared to the case where the volumetric capacity is out of the range, even if the anode active material includes silicon with high reactivity, the anode active material is resistant to reacting with another material. Thereby, in the secondary battery according to the embodiment of the invention, the electrolytic solution is resistant to decomposition during charge and discharge, so cycle characteristics may be improved. In this case, when the volumetric capacity of the pore group with a diameter ranging from 3 nm to 50 nm both inclusive per unit weight of silicon is 0.05 cm$^3$/g or less, more specifically 0 cm$^3$/g, a higher effect may be obtained.

Moreover, when the volumetric capacity of a pore group with a diameter ranging from 3 nm to 20 nm both inclusive per unit weight of silicon which is measured by mercury porosimetry using a mercury porosimeter is 0.2 cm$^3$/g or less, a higher effect may be obtained. In this case, the volumetric capacity of the pore group with a diameter ranging from 3 nm to 20 nm both inclusive per unit weight of silicon is 0.05 cm$^3$/g or less, or more specifically 0 cm$^3$/g, a higher effect may be obtained.

Further, when an oxide-containing film or a metal material which is not alloyed with an electrode reactant is included in pores, even in the case where the volumetric capacity of a pore group per unit weight of silicon is inherently out of the above-described range, the volumetric capacity of the pore group per unit weight of silicon may be easily controlled within the range. In this case, when the oxide-containing film is formed by a liquid-phase method such as a liquid-phase deposition method, or the metal material is formed by a liquid-phase method such as an electrolytic plating method, the oxide-containing film or the metal material is easily intruded into the pores, so a higher effect may be obtained.

When the anode active material includes oxygen, and the oxygen content in the anode active material is within a range from 3 at % to 40 at % both inclusive, or when the anode active material includes at least one kind of metal element selected from the group consisting of iron, cobalt, nickel, titanium, chromium and molybdenum, or when anode active material particles include an oxygen-containing region (a region in which oxygen is included and the oxygen content is higher than that in a region other than the region) in its thickness direction, a higher effect may be obtained.

When the ten-point height of roughness profile Rz of the surface of the anode current collector is within a range from 1.5 μm to 6.5 μm both inclusive, a higher effect may be obtained.

Other and further objects, features and advantages of the invention will appear more fully from the following description.

DETAILED DESCRIPTION OF THE PREFERRED EMBODIMENTS

A preferred embodiment will be described in detail below referring to the accompanying drawings.

Figure 1:
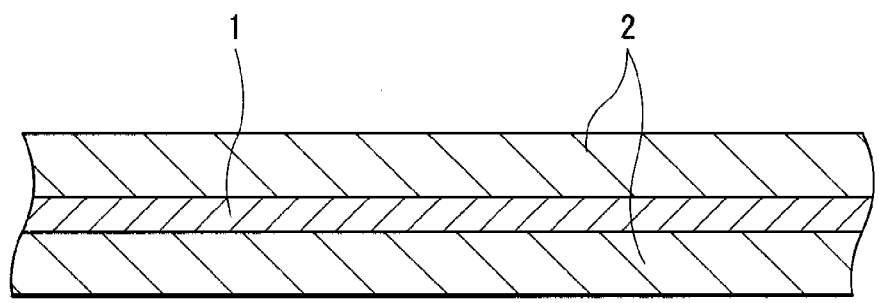
FIG. 1 is a sectional view showing the configuration of an anode according to an embodiment of the invention.

FIG. 1 shows a sectional view of an anode according to an embodiment of the invention. The anode is used in, for example, an electrochemical device such as a secondary battery, and includes an anode current collector 1 having a pair of surfaces, and an anode active material layer 2 arranged on the anode current collector 1.

The anode current collector 1 is preferably made of a metal material having good electrochemical stability, electrical conductivity and mechanical strength. Examples of the metal material include copper, nickel, stainless and the like. Among them, copper is preferable, because high electrical conductivity is obtained.

In particular, as the metal material of which the anode current collector 1 is made, a metal material including one kind or two or more kinds of metal elements which do not form an intermetallic compound with an electrode reactant is preferable. When the metal elements form an intermetallic compound with the electrode reactant, the influence of a stress due to swelling and shrinkage of the anode active material layer 2 during the operation of an electrochemical device (for example, during charge and discharge of a secondary battery) may cause a decline in the current collecting property or peeling of the anode active material layer 2 from the anode current collector 1. Examples of the metal elements include copper, nickel, titanium, iron, chromium and the like.

Moreover, the above-described metal material preferably includes one kind or two or more kinds of metal elements which are alloyed with the anode active material layer 2. It is because adhesion between the anode current collector 1 and the anode active material layer 2 is improved, so the anode active material layer 2 is less prone to being peeled from the anode current collector 1. Examples of metal elements which do not form an intermetallic compound with the electrode reactant and are alloyed with the anode active material layer 2 include copper, nickel, iron and the like in the case where the anode active material layer 2 includes silicon as an anode active material. These metal elements are preferable in terms of strength and electrical conductivity.

The anode current collector 1 may have a single-layer configuration or a multilayer configuration. In the case where the anode current collector 1 has a multilayer configuration, for example, it is preferable that a layer adjacent to the anode active material layer 2 is made of a metal material which is alloyed with the anode active material layer 2, and a layer not adjacent to the anode active material layer 2 is made of any other metal material.

The surface of the anode current collector 1 is preferably roughened. It is because adhesion between the anode current collector 1 and the anode active material layer 2 is improved by a so-called anchor effect. In this case, at least a surface facing the anode active material layer 2 of the anode current collector 1 may be roughened. As a roughening method, for example, a method of forming fine particles by electrolytic treatment or the like is cited. The electrolytic treatment is a method of forming fine particles on the surface of the anode current collector 1 in an electrolytic bath by an electrolytic method to form a roughened surface. Copper foil subjected to the electrolytic treatment is generally called "electrolytic copper foil".

The ten-point height of roughness profile Rz of the surface of the anode current collector 1 is preferably within a range from 1.5 μm to 6.5 μm both inclusive. It is because adhesion between the anode current collector 1 and the anode active material layer 2 is further improved. More specifically, when the ten-point height of roughness profile Rz is smaller than 1.5 μm, sufficient adhesion may not be obtained, and when the ten-point height of roughness profile Rz is larger than 6.5 μm, the anode active material may include a large number of holes to increase its surface area.

The anode active material layer 2 includes an anode active material capable of inserting and extracting an electrode reactant. The anode active material includes silicon as an element. It is because silicon has a high capability of inserting and extracting an electrode reactant, so a high energy density is obtained. Moreover, the anode active material includes a plurality of pores, so the diameters of the plurality of pores are distributed over a wide range from approximately a few nm to a few thousands nm. When attention is given to a pore group having a small diameter ranging from 3 nm to 50 nm both inclusive (hereinafter simply referred to as "a small pore group") among them, the volumetric capacity of the small pore group per unit weight of silicon, which is measured by mercury porosimetry using a mercury porosimeter, is 0.2 $cm^3/g$ or less. It is because the volumetric capacity of the small pore group is reduced, and the surface area of the anode active material is controlled to be small, so even in the case where the anode active material has high activity, the anode active material is less prone to reacting with another material. As another material, for example, an electrolytic solution in the case where the anode is used in a secondary battery is cited.

The volumetric capacity of the above-described small pore group is determined by replacing the amount of mercury intruded which is measured by mercury porosimetry using a mercury porosimeter with the volumetric capacity of the small pore group, and the amount of mercury intruded is a value measured under conditions that the surface tension and the contact angle of mercury are 485 mN/m and 130°, respectively, and a relationship between the diameter of a pore and pressure is approximate to 180/pressure=diameter. By this method, in the case where the diameters of the plurality of pores are distributed over a wide range, it is possible to measure the volumetric capacities of pores (the amount of mercury intruded into pores) in each specific diameter range, so it is possible to determine the above-described volumetric capacity ($cm^3/g$) of the small pore group per unit weight of silicon from the total weight (g) of silicon and the measured total amount of mercury intruded into pores with a diameter ranging from 3 nm to 50 nm both inclusive (the total volumetric capacity of the small pore group: $cm^3$). The reason why the pores with a diameter ranging from 3 nm to 50 nm both inclusive are used when defining the range of the volumetric capacity of the small pore group per unit weight of silicon is that as the volumetric capacity of each pore is small, but the total number of pores is extremely large, so the pores have a large influence on the surface area of the anode active material.

In particular, the volumetric capacity of the small pore group with a diameter ranging from 3 nm to 50 nm both inclusive per unit weight of silicon is preferably 0.05 $cm^3/g$ or less, and more preferably 0 $cm^3/g$, because a higher effect is obtained. As it is obvious that the volumetric capacity of the small pore group is measured by a mercury porosimeter, the capacity of the small pore group being 0 $cm^3/g$ means that the volumetric capacity of the small pore group is 0 $cm^3/g$ as a result measured by the mercury porosimeter (the volumetric capacity of the small pore group is unmeasurable).

In this case, when attention is given to a very small pore group with a diameter ranging from 3 nm to 20 nm both inclusive (hereinafter simply referred to as "a very small pore group") in the small pore group with a diameter ranging from 3 nm to 50 nm both inclusive, the volumetric capacity of the very small pore group per unit weight of silicon which is measured by mercury porosimetry using a mercury porosimeter is preferably 0.2 $cm^3/g$ or less, and more preferably 0.05 cm³/g or less, and more preferably 0 cm³/g. It is because the volumetric capacity of the very small pore group in the small pore group has a large influence on the surface area of the anode active material, so a higher effect is obtained.

The anode active material layer 2 may include, if necessary, an oxide-containing film or a metal material not alloyed with the electrode reactant in small pores to set the volumetric capacity of the small pore group per unit weight of silicon within the above-described range. It is because when the oxide-containing film or the metal material is intruded into the small pores, the volumetric capacity of the small pore group is reduced. In this case, when the small pores are completely filled with the oxide-containing film or the metal material, the volumetric capacity of the small pore group per unit weight of silicon may be 0 cm³/g.

The oxide-containing film includes, for example, at least one kind of oxide selected from the group consisting of an oxide of silicon, an oxide of germanium and an oxide of tin. The oxide-containing film may include any other oxide except for them. The oxide-containing film may be formed by any one of a vapor-phase method and a liquid-phase method. Among them, the liquid-phase method such as a liquid-phase deposition method, a sol-gel method a coating method or a dip coating method is preferable, and among them, the liquid-phase deposition method is more preferable, because the oxide-containing film is easily intruded into the small pores.

As the metal material intruded into the small pores, for example, a metal material including a metal element not alloyed with the electrode reactant as an element is cited, and, for example, at least one kind selected from the group consisting of iron, cobalt, nickel, zinc and copper is cited. The metal material may include any other metal element except for them. The form of the metal material is not limited to the simple substance, and the metal material may be an alloy or a metal compound. The metal material may be formed by any one of a vapor-phase method or a liquid-phase method. Among them, the liquid-phase method such as an electrolytic plating method or an electroless plating method is preferable, and the electrolytic plating method is more preferable, because the metal material is easily intruded into the small pores, and only a short plating time is necessary. When the anode active material layer 2 includes the metal material, the metal material functions as a binder, so binding in the anode active material is improved.

The anode active material layer 2 may include only one or both of the oxide-containing film and the metal material. In the case where only one of them is included, the oxide-containing film is preferably included. It is because the oxide-containing film formed by a liquid-phase method such as a liquid-phase deposition method is intruded into small pores more easily than the metal material formed by a liquid-phase method such as an electrolytic plating method.

The anode active material may be the simple substance, an alloy or a compound of silicon, or an anode active material including a phase including one kind or two or more kinds selected from them at least in part. Only one kind or mixture of a plurality of kinds selected from them may be used.

In the invention, the alloy includes an alloy including one or more kinds of metal elements and one or more kinds of metalloid elements in addition to an alloy including two or more kinds of metal elements. Further, in the invention, the alloy may include a non-metal element. As the texture of the alloy, a solid solution, a eutectic (eutectic mixture), an intermetallic compound or the coexistence of two or more kinds selected from them is cited.

As an alloy of silicon, for example, an alloy including at least one kind selected from the group consisting of tin (Sn), nickel, copper, iron, cobalt, manganese (Mn), zinc, indium (In), silver (Ag), titanium, germanium (Ge), bismuth (Bi), antimony (Sb) and chromium as an element except for silicon is cited.

As a compound of silicon, for example, a compound including oxygen or carbon (C) as an element except for silicon is cited. For example, the compound of silicon may include one kind or two or more kinds selected from elements described in the alloy of silicon as elements except for silicon.

The anode active material is attached to the anode current collector 1, and is grown from the surface of the anode current collector 1 in the thickness direction of the anode active material layer 2. In this case, the anode active material is formed by a vapor-phase method, and as described above, the anode current collector 1 and the anode active material layer 2 are preferably alloyed at least in a part of an interface therebetween. More specifically, the elements of the anode current collector 1 may be diffused into the anode active material layer 2 in the interface, or the elements of the anode active material layer 2 may be diffused into the anode current collector 1 in the interface, or they may be diffused into each other in the interface. It is because it is difficult to cause a fracture in the anode active material layer 2 due to swelling and shrinkage thereof during electrode reaction, and electron conductivity between the anode current collector 1 and the anode active material layer 2 is improved.

As the above-described vapor-phase method, for example, a physical deposition method or a chemical deposition method, more specifically, a vacuum deposition method, a sputtering method, an ion plating method, a laser ablation method, a thermal CVD (Chemical Vapor Deposition) method, a plasma chemical vapor deposition method or the like is cited.

Moreover, the anode active material may have the form of a plurality of particles. The anode active material may be formed by one deposition step to have a single-layer configuration, or may be formed by a plurality of deposition steps to have a multilayer configuration in particles. However, in the case where the anode active material is formed by an evaporation method accompanied by high heat during deposition, to prevent the anode current collector 1 from suffering heat damage, the anode active material preferably has a multilayer configuration. It is because when the step of depositing the anode active material is divided into several times to be performed (the anode active material is successively formed to be deposited), compared to the case where the deposition step is performed only once, the time that the anode current collector 1 is exposed to high heat is reduced.

In particular, the anode active material preferably includes oxygen as an element. It is because swelling and shrinkage of the anode active material layer 2 are prevented. In the anode active material layer 2, at least a part of oxygen is bonded to a part of silicon. In this case, bonding between oxygen and silicon may be in the state of silicon monoxide or silicon dioxide, or in any other metastable state.

The oxygen content in the anode active material is preferably within a range from 3 at % to 40 at % both inclusive, because a higher effect is obtained. More specifically, when the oxygen content is smaller than 3 at %, there is a possibility that swelling and shrinkage of the anode active material layer 2 are not sufficiently prevented, and when the oxygen content is larger than 40 at %, there is a possibility that resistance is increased too much. In the case where the anode is used with an electrolytic solution in an electrochemical device, a coating formed by the decomposition of the electrolytic solution is not included in the anode active material. In other words, in the case where the oxygen content in the anode active material is determined by calculation, oxygen in the above-described coating is not included.

For example, in the case where the anode active material is formed by a vapor-phase method, the anode active material including oxygen may be formed by continuously introducing an oxygen gas into a chamber. In particular, in the case where a desired oxygen content is not obtained only by introducing the oxygen gas, a liquid (for example, water vapor or the like) may be introduced into the chamber as a supply source of oxygen.

Moreover, the anode active material preferably includes at least one kind of metal element selected from the group consisting of iron, cobalt, nickel, titanium, chromium and molybdenum. It is because binding in the anode active material is improved, and swelling and shrinkage of the anode active material layer 2 are prevented, and the resistance of the anode active material is reduced. The content of the metal element in the anode active material is freely settable. However, in the case where the anode is used in a secondary battery, when the content of the metal element is too large, to obtain a desired battery capacity, it is necessary to increase the thickness of the anode active material layer 2, so the anode active material layer 2 may be peeled from the anode current collector 1, or the anode active material layer 2 may be cracked.

The anode active material including the above-described metal element may be formed by using an evaporation source in which a metal element is mixed, or a multicomponent evaporation source when the anode active material is formed by an evaporation method as a vapor-phase method.

The anode active material includes an oxygen-containing region including oxygen in its thickness direction, and the oxygen content in the oxygen-containing region is preferably higher than the oxygen content in a region other than the oxygen-containing region. It is because swelling and shrinkage of the anode active material layer 2 are prevented. The region other than the oxygen-containing region may or may not include oxygen. In the case where the region other than the oxygen-containing region includes oxygen, the oxygen content in the region other than the oxygen-containing region is lower than that in the oxygen-containing region.

In this case, to prevent swelling and shrinkage of the anode active material layer 2, it is preferable that the region other than the oxygen-containing region includes oxygen, and the anode active material includes a first oxygen-containing region (a region having a lower oxygen content) and a second oxygen-containing region having a higher oxygen content than the first oxygen-containing region (a region having a higher oxygen content). In this case, the second oxygen-containing region is preferably sandwiched by the first oxygen-containing region, and more preferably, the first oxygen-containing region and the second oxygen-containing region are alternately laminated. It is because a higher effect is obtained. The oxygen content in the first oxygen-containing region is preferably as low as possible, and, for example, the oxygen content in the second oxygen-containing region is equal to the oxygen content in the case where the above-described material includes oxygen.

The anode active material including the first and second oxygen-containing regions may be formed by intermittently introducing an oxygen gas into a chamber, or changing the amount of the oxygen gas introduced into the chamber in the case where the anode active material is formed by, for example, a vapor-phase method. In the case where a desired oxygen content is not obtained only by introducing the oxygen gas, a liquid (for example, a water vapor or the like) may be introduced into the chamber.

The oxygen contents in the first and second oxygen-containing regions may or may not be distinctly different from each other. In particular, in the case where the amount of the above-described oxygen gas introduced is continuously changed, the oxygen content may be also continuously changed. In the case where the amount of the oxygen gas introduced is intermittently changed, the first and second oxygen-containing regions become so-called "layers", and in the case where the amount of the oxygen gas introduced is continuously changed, the first and second oxygen-containing regions become "laminar" rather than "layers". In the latter case, the oxygen content in the anode active material is distributed while the oxygen content changed up and down repeatedly. In this case, the oxygen content is preferably changed step by step or continuously between the first and second oxygen-containing regions. When the oxygen content is rapidly changed, ion diffusion may decline or resistance may be increased.

Figure 2A:
FIGS. 2A and 2B are an SEM photograph and a schematic view showing a sectional configuration of the anode shown in FIG. 1.
Figure 2B:
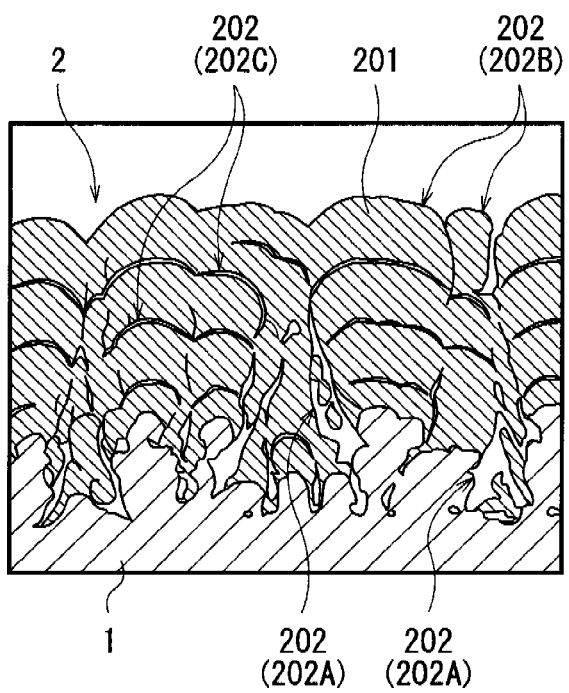
Figure 3:
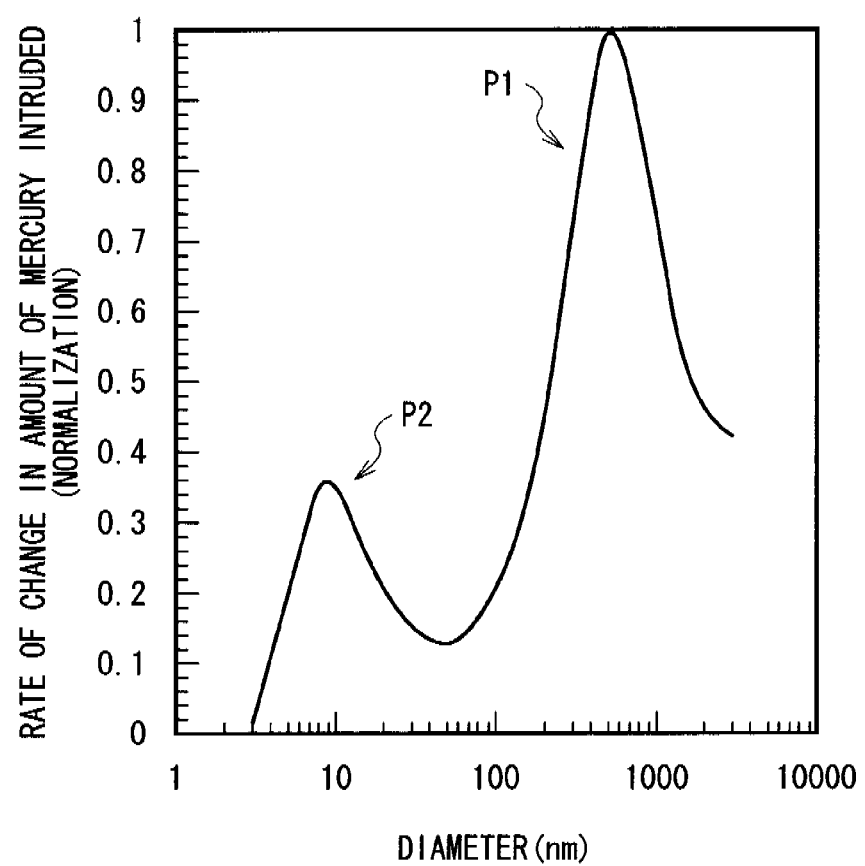
FIG. 3 is a chart showing the distribution of the rate of change in the amount of mercury intruded.
Figure 4A:
FIGS. 4A and 4B are an SEM photograph and a schematic view showing another sectional configuration of the anode shown in FIG. 1.
Figure 4B:
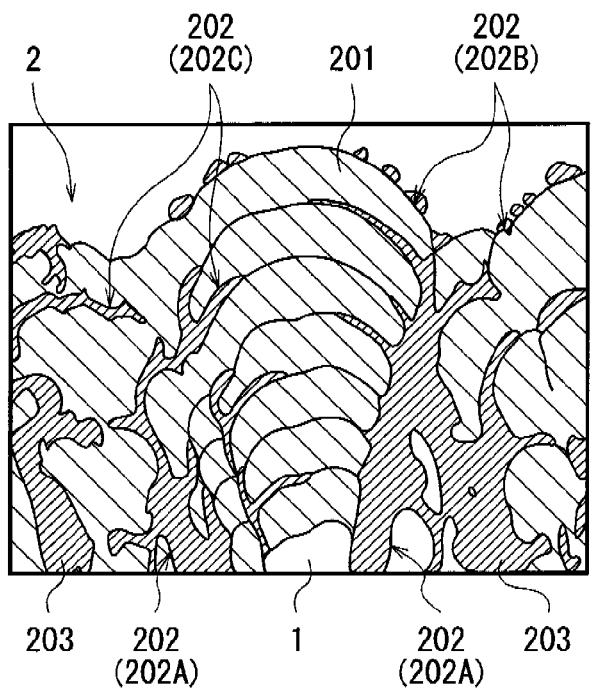

Referring to FIGS. 2A and 2B to 4A and 4B, a specific configuration example of the anode in the case where a particulate anode active material has a multilayer configuration in its particles will be described below. FIGS. 2A, 2B, 4A and 4B show enlarged sectional views of the anode, and FIGS. 2A and 4A show scanning electron microscope (SEM) photographs (secondary electron images), and FIGS. 2B and 4B show schematic views of the SEM images shown in FIGS. 2A and 4A, respectively. FIG. 3 shows a distribution of the rate of change in the amount of mercury intruded.

As shown in FIGS. 2A and 2B, in the case where the anode active material includes a plurality of particles (anode active material particles 201), the anode active material includes a plurality of pores 202. More specifically, on the roughened surface of the anode current collector 1, a plurality of projections (for example, fine particles formed by electrolytic treatment) are present. In this case, the anode active material is deposited and laminated on the surface of the anode current collector 1 a plurality of times by a vapor-phase method or the like so as to grow the anode active material particles 201 step by step in a thickness direction on each of the above-described projections. Because of the closely packed configuration of the plurality of anode active material particles 201, the multilayer configuration and the surface configuration, a plurality of pores 202 are formed.

The pores 202 include three kinds, that is, pores 202A, 202B and 202C classified by causes of formation. The pores 202A are gaps formed between the anode active material particles 201 growing on each projection which is present on the surface of the anode current collector 1. The pores 202B are gaps formed between small stubble-shaped projections (not shown) which are formed on the surfaces of the anode active material particles 201. The pores 202B may be formed on the whole exposed surfaces of the anode active material particles 201, or a part of the exposed surfaces of the anode active material particles 201. The anode active material particles 201 have a multilayer configuration, and the pores 202C are gaps formed between layers of the multilayer configuration. The above-described small stubble-shaped projections are formed on the surfaces of the anode active material particles 201 in each formation of the anode active material particles 201, so the pores 202B are formed not only on the exposed surfaces (the outer surfaces) of the anode active material particles 201 but also between layers. The pores 202 may include any other pores formed because of any other cause of formation except for the above-described causes of formation.

When the amount V of mercury intruded into the pores 202 is measured while increasing a pressure P by a mercury porosimeter in stages, the rate of change ($\Delta V/\Delta P$) in the amount of mercury intruded is distributed as shown in FIG. 3. In FIG. 3, the horizontal axis indicates the diameters (nm) of the pores 202, and the vertical axis indicates the rate of change in the amount of mercury intruded into the pores 202. The rate of change in the amount of mercury intruded is distributed so that two peaks P1 and P2 are shown in a diameter ranging from 3 nm to 3000 nm both inclusive which is measurable by the mercury porosimeter. The peak P1 on a wide diameter side is formed mainly due to the presence of the pores 202A, and the distribution range of the diameter is from 50 nm to 3000 nm both inclusive. On the other hand, the peak P2 on a narrow diameter side is formed mainly due to the presence of the pores 202B and 202C, and the distribution range of the diameter is 3 nm to 50 nm both inclusive. The rate of change in the amount of mercury intruded on the vertical axis of FIG. 3 is a normalized value under the condition that the rate of change at the peak P1 (the maximum value of the rate of change in a diameter ranging from 50 nm to 3000 nm both inclusive) is 1.

As shown in FIGS. 4A and 4B, after a plurality of anode active material particles 201 are formed, a metal material 203 is formed by an electrolytic plating method or the like, thereby the metal material 203 is intruded into the pores 202. In other words, the metal material 203 is intruded into gaps (the pores 202A) between adjacent anode active material particles 201, gaps (pores 202B) between small stubble-shaped projections formed on the surfaces of the anode active material particles 201, and gaps (the pores 202C) in the anode active material particles 201. In FIGS. 4A and 4B, dotting the metal material 203 around the surfaces of the anode active material particles 202 in the outermost layer means that the above-described small projections are present in positions where the metal material 203 is dotted.

As shown in FIGS. 2A and 2B to 4A and 4B, in the case where the particulate anode active material has a multilayer configuration in its particles, the above-described small pores include both of the pores 202B and 202C. In this case, only to set the volumetric capacity of the small pore group per unit weight of silicon within the above-described range, the metal material 203 may include only pores 202B and 202C; however, in consideration of the performance of the whole anode, the metal material 203 is preferably intruded into the pores 202A, and the pores 202A is more preferably filled with the metal material 203. It is because the binding in the anode active material is improved by the metal material 203, and swelling and shrinkage of the anode active material layer 2 do not easily occur.

In the case where the particulate anode active material does not have a multilayer configuration in its particles (has a single-layer configuration), the pores 202C are not formed, so small pores include only the pores 202B.

Although specific description is not given referring to drawings here, in the case where instead of the metal material, the oxide-containing film is formed by a liquid-phase deposition method or the like, the oxide-containing film is grown along the surfaces of the anode active material particles 201, so the oxide-containing film is preferentially intruded into the pores 202B and 202C. In this case, when the deposition time is increased, the oxide-containing film is intruded into the pores 202A.

The anode is manufactured by the following steps, for example.

At first, after the anode current collector 1 is prepared, roughening treatment is subjected to the surface of the anode current collector 1 if necessary. Next, silicon is deposited on the anode current collector 1 by a vapor-phase method or the like to form the anode active material. In the case where the anode active material is formed, the anode active material may be formed by one deposition step to have a single-layer configuration, or the anode active material may be formed by a plurality of deposition steps to have a multilayer configuration. In the case where the anode active material is formed by a vapor-phase method to have a multilayer configuration, silicon may be deposited a plurality of times while the anode current collector 1 is moved back and forth relatively to an evaporation source, or silicon may be deposited a plurality of times while the anode current collector 1 is fixed relative to the evaporation source, and a shutter is repeatedly opened and closed. After that, an oxide-containing film or a metal material not alloyed with an electrode reactant may be formed by a liquid-phase method or the like. In the case where the oxide-containing film is formed by a liquid-phase deposition method, after a dissolved species which easily coordinates fluorine as an anion trapping agent is added to and mixed with a solution of a fluoride complex such as silicon to form a mixture, the anode current collector 1 on which the anode active material is formed is immersed in the mixture, and then a fluorine anion generated from the fluoride complex is trapped by the dissolved species, thereby an oxide is deposited on the surface of the anode active material. In this case, instead of the fluoride complex, a compound of silicon or the like generating other anions such as sulfate ions may be used. Thereby, the anode active material layer 2 is formed, so the anode is completed.

In the anode, the anode active material includes silicon, and has the small pore group (a pore group with a diameter ranging from 3 nm to 50 nm both inclusive), and the volumetric capacity of the small pore group per unit weight of silicon which is measured by mercury porosimetry using a mercury porosimeter is 0.2 cm$^3$/g or less, so compared to the case where the volumetric capacity is out of the range, even in the case where the anode active material includes silicon having high activity, the anode active material is resistant to reacting with another material. Therefore, the anode active material is capable of contributing to an improvement in cycle characteristics of an electrochemical device using the anode. In this case, when the volumetric capacity of the small pore group per unit weight of silicon is 0.05 cm$^3$/g or less, or more specifically 0 cm$^3$/g, a higher effect may be obtained.

In particular, when the volumetric capacity of the very small pore group (a pore group with a diameter ranging from 3 nm to 20 nm both inclusive) per unit weight of silicon which is measured by mercury porosimetry using a mercury porosimeter is 0.2 cm$^3$/g or less, a higher effect may be obtained. In this case, when the volumetric capacity of the very small pore group per unit weight of silicon is 0.05 cm$^3$/g or less, or more specifically 0 cm$^3$/g, a higher effect may be obtained.

Moreover, when the oxide-containing film or the metal material not alloyed with an electrode reactant is included in small pores, even in the case where the volumetric capacity of the small pore group per unit weight of silicon is out of the above-described range, the volumetric capacity of the small pore group per unit weight of silicon may be easily controlled within the range. In this case, when the oxide-containing film is formed by a liquid-phase method such as a liquid-phase deposition method, or the metal material is formed by a liquid-phase method such as an electrolytic plating method is formed, the oxide-containing film or the metal material is easily intruded into small pores, so a higher effect may be obtained.

Further, when the anode active material includes oxygen, and the oxygen content in the anode active material is within a range from 3 at % to 40 at % both inclusive, or when the anode active material includes at least one kind of metal element selected from the group consisting of iron, cobalt, nickel, titanium, chromium and molybdenum, or when the anode active material particles includes an oxygen-containing region (a region including oxygen in which the oxygen content is higher than that in a region other than the region) in its thickness direction, a higher effect may be obtained.

When the surface facing the anode active material layer 2 of the anode current collector 1 is roughened by fine particles formed by electrolytic treatment, adhesion between the anode current collector 1 and the anode active material layer 2 may be improved. In this case, when the ten-point height of roughness profile Rz of the surface of the anode current collector 1 is within a range from 1.5 μm to 6.5 μm both inclusive, a higher effect may be obtained.

Next, application examples of the above-described anode will be described below. As an example of the electrochemical device, a secondary battery is used, and the anode is used in the secondary battery as below.

(First Secondary Battery)

Figure 5:
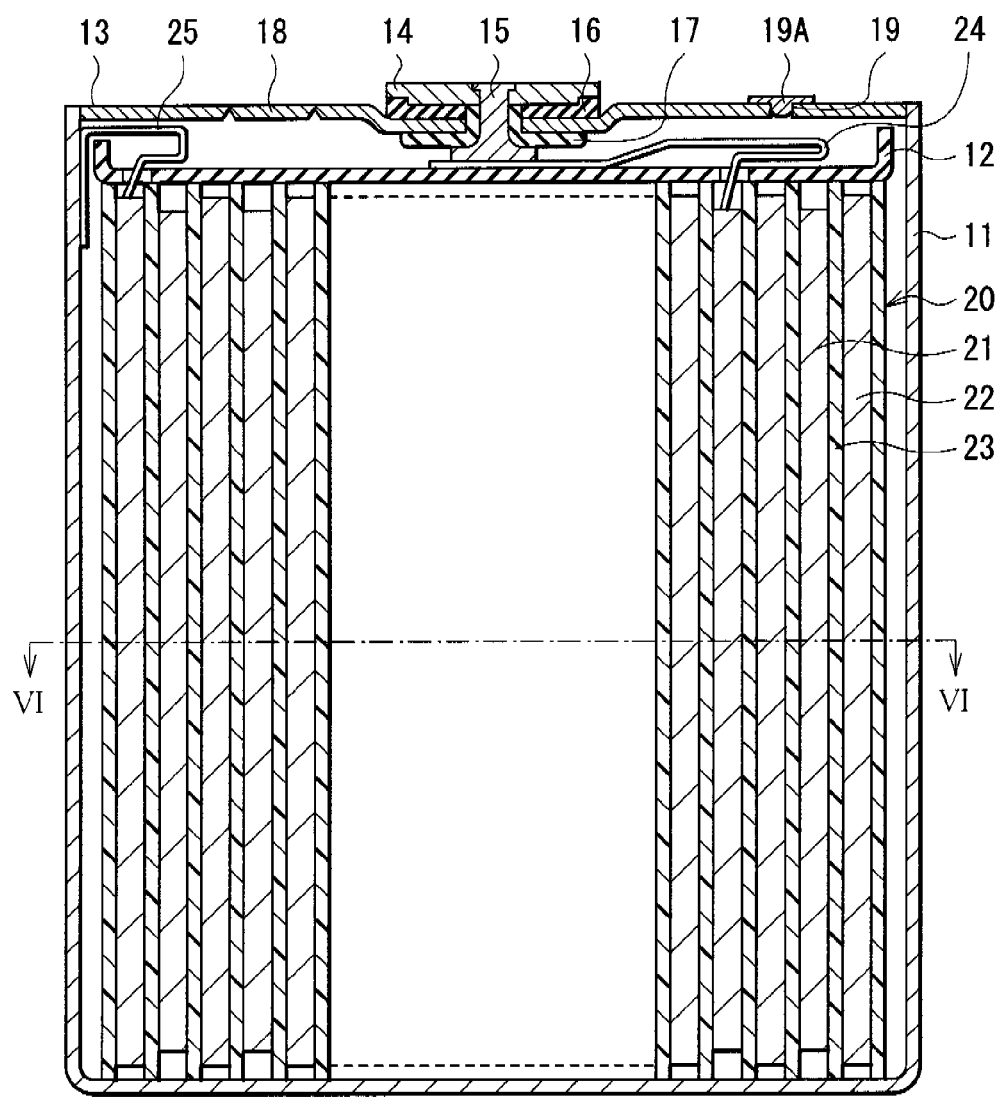
FIG. 5 is a sectional view showing the configuration of a first secondary battery including the anode according to the embodiment of the invention.
Figure 6:
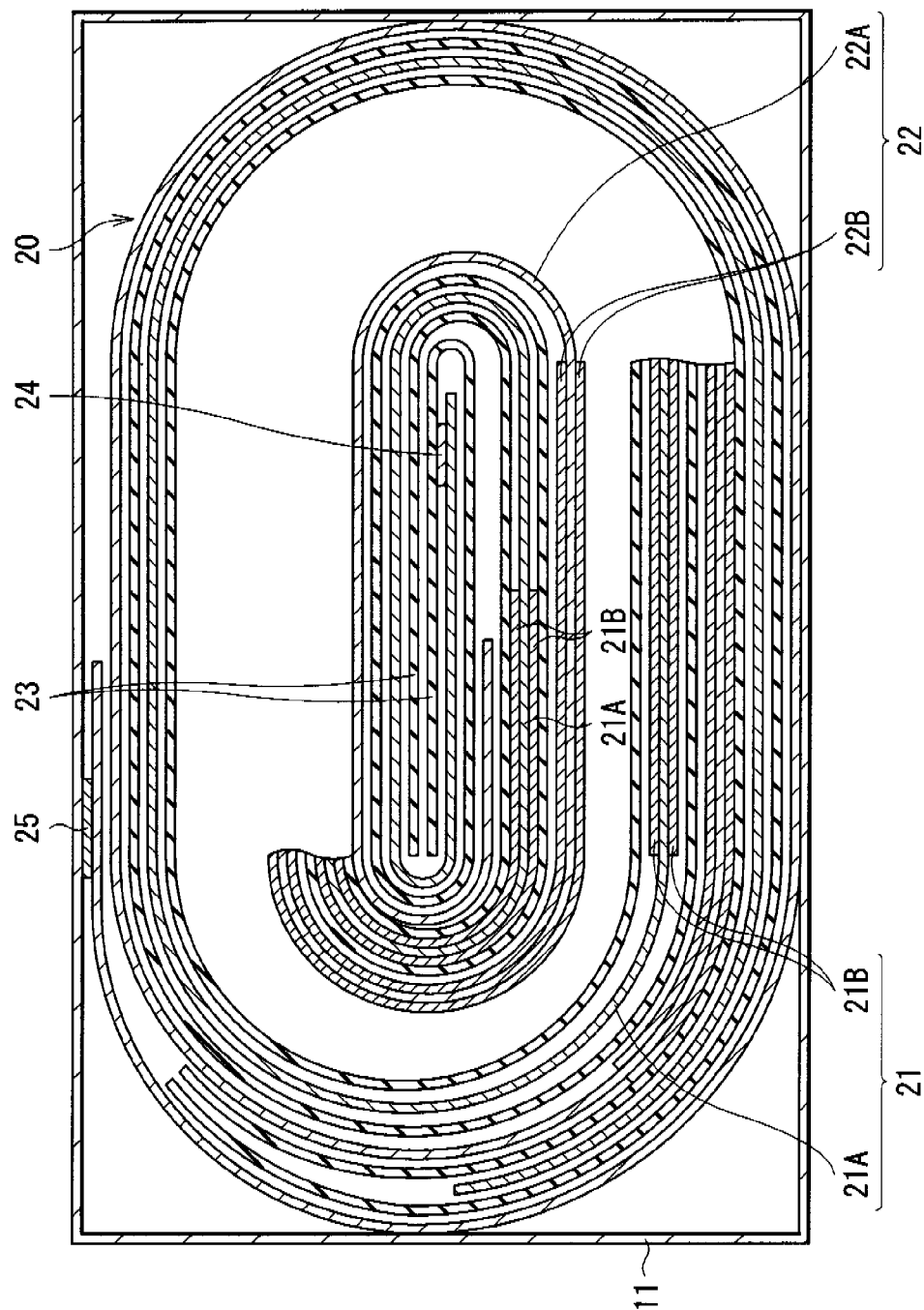
FIG. 6 is a sectional view of the first secondary battery taken along a line VI-VI of FIG. 5.

FIGS. 5 and 6 show sectional views of a first secondary battery, and FIG. 6 shows a sectional view taken along a line VI-VI of FIG. 5. The secondary battery described here is, for example, a lithium-ion secondary battery in which the capacity of an anode 22 is represented based on insertion and extraction of lithium as an electrode reactant.

The secondary battery contains a battery element 20 having a flat winding configuration in a battery can 11.

The battery can 11 is, for example, a prismatic package member. As shown in FIG. 6, in the prismatic package member, a sectional surface in a longitudinal direction has a rectangular shape or a substantially rectangular shape (including a curve in part), and the prismatic package member forms not only a prismatic battery with a rectangular shape but also a prismatic battery with an oval shape. In other words, the prismatic package member is a vessel-shaped member having a rectangular closed end or a oval closed end and an opening with a rectangular shape or a substantially rectangular (an oval) shape formed by connecting arcs with straight lines. In FIG. 6, the battery can 11 having a rectangular sectional surface is shown. The battery configuration including the battery can 11 is a so-called prismatic type.

The battery can 11 is made of, for example, a metal material including iron or aluminum (Al), or an alloy thereof, and may have a function as an electrode terminal. In this case, to prevent swelling of the secondary battery through the use of the hardness (resistance to deformation) of the battery can 11 during charge and discharge, iron which is harder than aluminum is preferable. In the case where the battery can 11 is made of iron, for example, iron may be plated with nickel (Ni) or the like.

Moreover, the battery can 11 has a hollow configuration having an open end and a closed end, and an insulating plate 12 and a battery cover 13 are attached to the open end, and the battery can 11 is sealed. The insulating plate 12 is arranged between the battery element 20 and the battery cover 13 in a direction perpendicular to a peripheral winding surface of the battery element 20, and the insulating plate 12 is made of, for example, polypropylene or the like. The battery cover 13 is made of, for example, the same material as that of the battery can 11, and may have a function as an electrode terminal in the same manner.

A terminal plate 14 which becomes a cathode terminal is arranged outside of the battery cover 13, and the terminal plate 14 is electrically insulated from the battery cover 13 by an insulating case 16. The insulating case 16 is made of, for example, polybutylene terephthalate or the like. Moreover, a through hole is arranged around the center of the battery cover 13, and a cathode pin 15 is inserted into the through hole so as to be electrically connected to the terminal plate 14 and to be electrically insulated from the battery cover 13 by a gasket 17. The gasket 17 is made of, for example, an insulating material, and its surface is coated with asphalt.

A cleavage valve 18 and an injection hole 19 are arranged around an edge of the battery cover 13. The cleavage valve 18 is electrically connected to the battery cover 13, and when an internal pressure in the secondary battery increases to a certain extent or higher due to an internal short circuit or external application of heat, the cleavage valve 18 is separated from the battery cover 13 to release the internal pressure. The injection hole 19 is filled with a sealing member 19A made of, for example, a stainless steel ball.

The battery element 20 is formed by laminating a cathode 21 and an anode 22 with a separator 23 in between, and spirally winding them, and has a flat shape according to the shape of the battery can 11. A cathode lead 24 made of aluminum or the like is attached to an end (for example, an inside end) of the cathode 21, and an anode lead 25 made of nickel or the like is attached to an end (for example, an outside end) of the anode 22. The cathode lead 24 is welded to an end of the cathode pin 15 to be electrically connected to the terminal plate 14, and the anode lead 25 is welded and electrically connected to the battery can 11.

The cathode 21 is formed by arranging a cathode active material layer 21B on both sides of a strip-shaped cathode current collector 21A. The cathode current collector 21A is made of, for example, a metal material such as aluminum, nickel or stainless. The cathode active material layer 21B includes a cathode active material, and may include a binder, an electrical conductor or the like, if necessary.

The cathode active material includes one kind or two or more kinds of cathode materials capable of inserting and extracting lithium as an electrode reactant. As the cathode material, for example, lithium cobalt oxide, lithium nickel oxide, a solid solution including lithium cobalt oxide and lithium nickel oxide ($Li(Ni_xCo_yMn_z)O_2$; the values of x, y and z are $0<x<1$, $0<y<1$ and $0 \leq z<1$, and $x+y+z=1$), lithium complex oxide such as lithium manganese oxide ($LiMn_2O_4$) with a spinel structure or a solid solution thereof ($Li(Mn_{2-v}Ni_v)O_4$; the value of v is $v<2$) or the like is cited. Moreover, as the cathode material, for example, a phosphate compound with an olivine structure such as lithium iron phosphate ($LiFePO_4$) is also cited. It is because a high energy density is obtained. In addition to the above-described materials, the cathode material may be, for example, an oxide such as titanium oxide, vanadium oxide or manganese dioxide, a bisulfide such as iron bisulfide, titanium bisulfide or molybdenum sulfide, sulfur, or a conductive polymer such as polyaniline or polythiophene.

The anode 22 has the same configuration as that of the above-described anode, and is formed by arranging an anode active material layer 22B on both sides of a strip-shaped anode current collector 22A. The configurations of the anode current collector 22A and the anode active material layer 22B are the same as those of the anode current collector 1 and the anode active material layer 2 in the above-described anode, respectively. The charge capacity of the anode active material capable of inserting and extracting lithium is preferably larger than the charge capacity of the cathode 21.

The separator 23 isolates between the cathode 21 and the anode 22 so that ions of an electrode reactant pass therethrough while preventing a short circuit of a current due to contact between the cathode 21 and the anode 22. The separator 23 is made of, for example, a porous film of a synthetic resin such as polytetrafluoroethylene, polypropylene or polyethylene, a porous ceramic film or the like, and the separator 23 may have a configuration in which two or more kinds of the porous films are laminated.

The separator 23 is impregnated with an electrolytic solution as a liquid electrolyte. The electrolytic solution includes a solvent and an electrolyte salt dissolved in the solvent.

The solvent includes, for example, one kind or two or more kinds of nonaqueous solvents such as organic solvents. Examples of the nonaqueous solvents include carbonate-based solvents such as ethylene carbonate, propylene carbonate, butylene carbonate, dimethyl carbonate, diethyl carbonate, ethyl methyl carbonate and methyl propyl carbonate. It is because superior capacity characteristics, storage characteristics and cycle characteristics are obtained. Only one kind or a mixture of a plurality of kinds selected from them may be used. Among them, as the solvent, a mixture of a high-viscosity solvent such as ethylene carbonate or propylene carbonate and a low-viscosity solvent such as dimethyl carbonate, ethyl methyl carbonate or diethyl carbonate is preferable. It is because the dissociation property of the electrolyte salt and ion mobility are improved, so a higher effect is obtained.

Moreover, the solvent preferably includes a halogenated carbonate. It is because a stable coating is formed on a surface of the anode 22 to prevent decomposition of the electrolytic solution, thereby the cycle characteristics are improved. As the halogenated carbonate, a fluorinated carbonate is preferable, and difluoroethylene carbonate is more preferable, because a higher effect is obtained. As the difluoroethylene carbonate, for example, 4,5-difluoro-1,3-dioxolane-2-one or the like is cited.

Further, the solvent preferably includes a cyclic carbonate including an unsaturated bond, because the cycle characteristics are improved. Examples of the cyclic carbonate including an unsaturated bond include vinylene carbonate, vinyl ethylene carbonate and the like, and a mixture of them may be used.

Moreover, the solvent preferably includes a sultone. It is because the cycle characteristics are improved, and swelling of the secondary battery is prevented. Examples of the sultone include 1,3-propene sultone and the like.

The electrolyte salt includes one kind or two or more kind of light metal salts such as lithium salt. Examples of the lithium salt include lithium hexafluorophosphate ($LiPF_6$), lithium perchlorate ($LiClO_4$), lithium hexafluoroarsenate ($LiAsF_6$) and the like. It is because superior capacity characteristics, storage characteristics and cycle characteristics are obtained. Only one kind or a mixture of a plurality of kinds selected from them may be used. Among them, as the electrolyte salt, lithium hexafluorophosphate is preferable, because internal resistance is reduced, so a higher effect is obtained.

Moreover, the electrolyte salt preferably includes a compound including boron and fluorine, because cycle characteristics are improved, and swelling of the secondary battery is prevented. Examples of the compound including boron and fluorine include lithium tetrafluoroborate and the like.

The content of the electrolyte salt in the solvent is, for example, within a range from 0.3 mol/kg to 3.0 mol/kg both inclusive, because superior capacity characteristics are obtained.

The secondary battery is manufactured by the following steps, for example.

At first, the cathode 21 is formed. At first, after the cathode active material, a binder and an electrical conductor are mixed to form a cathode mixture, the cathode mixture is dispersed in an organic solvent to form a paste-form cathode mixture slurry. Next, the cathode mixture slurry is uniformly applied to both sides of the cathode current collector 21A through the use of a doctor blade, a bar coater or the like, and the cathode mixture slurry is dried. Finally, the cathode mixture slurry is compression molded by a roller press while applying heat, if necessary, thereby the cathode active material layer 21B is formed. In this case, compression molding may be repeated a plurality of times.

Next, the anode active material layer 22B is formed on both sides of the anode current collector 22A by the same steps as the above-described steps of forming the anode so as to form the anode 22.

Then, the battery element 20 is formed through the use of the cathode 21 and the anode 22. At first, the cathode lead 24 and the anode lead 25 are attached to the cathode current collector 21A and the anode current collector 22A, respectively. Next, the cathode 21 and the anode 22 are laminated with the separator 23 in between to form a laminate, and the laminate are spirally wound in a longitudinal direction. Finally, the laminate is molded into a flat shape to form the battery element 20.

Finally, the secondary battery is assembled. At first, after the battery element 20 is contained in the battery can 11, the insulating plate 12 is arranged on the battery element 20. Next, after the cathode lead 24 and the anode lead 25 are connected to the cathode pin 15 and the battery can 11, respectively, by welding or the like, the battery cover 13 is fixed in an open end of the battery can 11 by laser welding or the like. Finally, the electrolytic solution is injected into the battery can 11 through the injection hole 19 so that the separator 23 is impregnated with the electrolytic solution, and then the injection hole 19 is filled with the sealing member 19A. Thereby, the secondary battery shown in FIGS. 5 and 6 is completed.

When the secondary battery is charged, for example, lithium ions are extracted from the cathode 21, and are inserted into the anode 22 through the electrolytic solution with which the separator 23 is impregnated. On the other hand, when the secondary battery is discharged, the lithium ions are extracted from the anode 22 and are inserted into the cathode 21 through the electrolytic solution with which the separator 23 is impregnated.

In the prismatic secondary battery, the anode 22 has the same configuration as that of the above-described anode, so even if charge and discharge are repeated, the discharge capacity does not easily decline. Therefore, the cycle characteristics may be improved. In this case, in the case where the anode 22 includes silicon which is advantageous to increase a capacity, the cycle characteristics are improved, so a higher effect than that in the case where the anode includes another anode material such as a carbon material may be obtained. The effects of the secondary battery except for the above-described effects are the same as those of the above-described anode.

In particular, in the case where the battery can 11 is made of a hard metal, compared to the case where the battery can 11 is made of a soft film, the anode 22 is resistant to damage due to swelling and shrinkage of the anode active material layer 22B. Therefore, the cycle characteristics may be improved. In this case, when the battery can 11 is made of iron which is harder than aluminum, a higher effect may be obtained.

(Second Secondary Battery)

Figure 7:
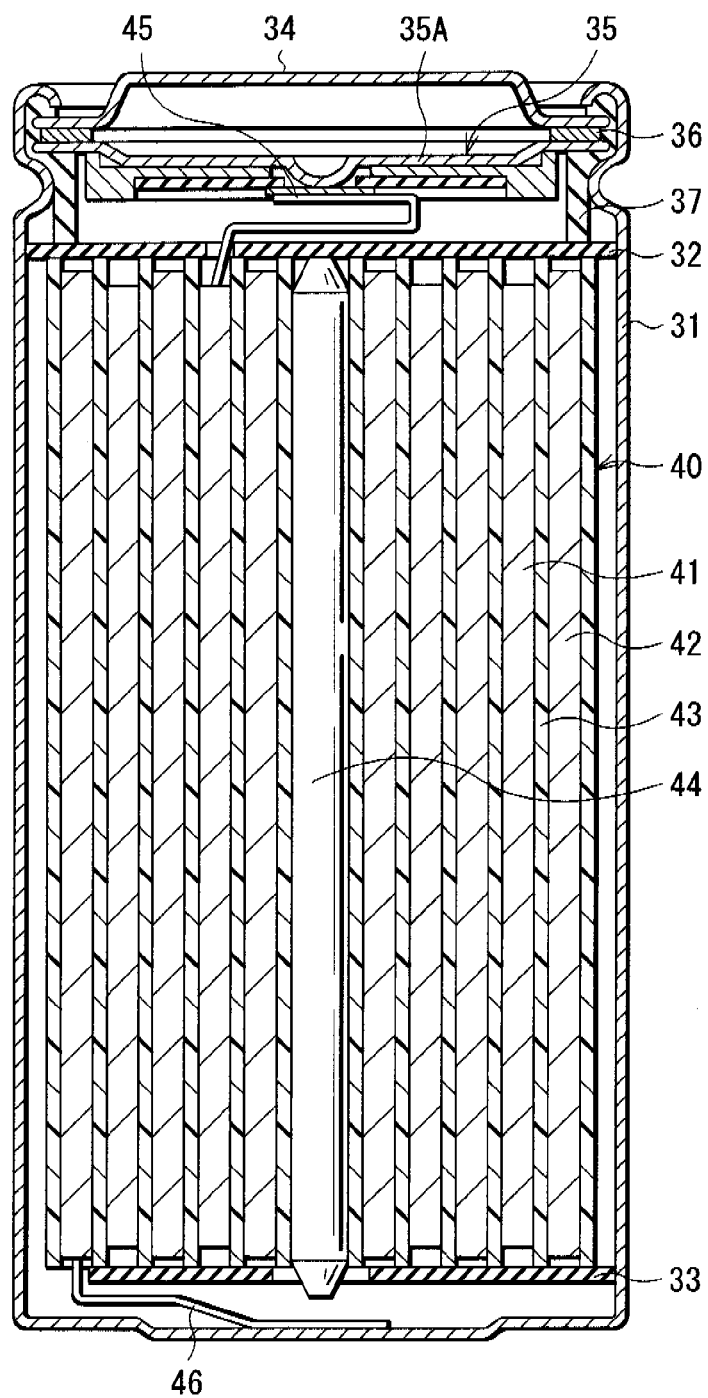
FIG. 7 is a sectional view showing a second secondary battery including the anode according to the embodiment of the invention.
Figure 8:
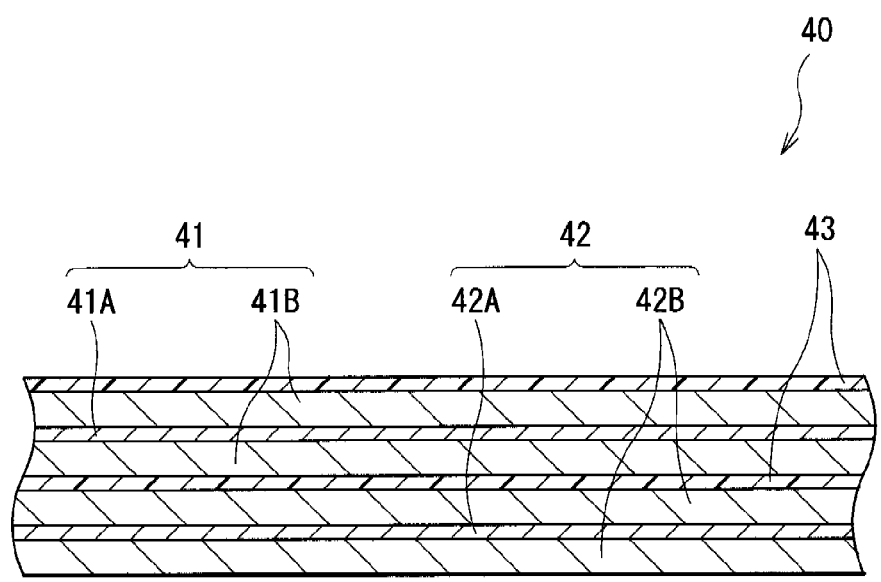
FIG. 8 is an enlarged sectional view showing a part of a spirally wound electrode body shown in FIG. 7.

FIGS. 7 and 8 show sectional views of a second secondary battery, and FIG. 8 shows an enlarged view of a part of a spirally wound electrode body 40 shown in FIG. 7. The secondary battery is a lithium-ion secondary battery as in the case of the first secondary battery, and includes the spirally wound electrode body 40 which includes a cathode 41 and an anode 42 spirally wound with a separator 43 in between, and a pair of insulating plates 32 and 33 in a substantially hollow cylindrical-shaped battery can 31. The battery configuration including the battery can 31 is called a so-called cylindrical type.

The battery can 31 is made of, the same metal material as that of the battery can 11 in the first secondary battery, and an end of the battery can 31 is closed, and the other end thereof is opened. The spirally wound electrode body 40 is sandwiched between the pair of insulating plates 32 and 33, and the pair of insulating plates 32 and 33 are arranged so as to extend in a direction perpendicular to a peripheral winding surface.

In the open end of the battery can 31, a battery cover 34, and a safety valve mechanism 35 and a positive temperature coefficient device (PTC device) 36 arranged inside the battery cover 34 are mounted by caulking by a gasket 37. Thereby, the interior of the battery can 31 is sealed. The battery cover 34 is made of, for example, the same material as that of the battery can 31. The safety valve mechanism 35 is electrically connected to the battery cover 34 through the PTC device 36. In the safety valve mechanism 35, when an internal pressure in the secondary battery increases to a certain extent or higher due to an internal short circuit or external application of heat, a disk plate 35A is flipped so as to disconnect the electrical connection between the battery cover 34 and the spirally wound electrode body 40. When a temperature rises, the PTC device 36 limits a current by an increased resistance to prevent abnormal heat generation caused by a large current. The gasket 37 is made of, for example, an insulating material, and its surface is coated with asphalt.

For example, a center pin 44 may be inserted into the center of the spirally wound electrode body 40. In the spirally wound electrode body 40, a cathode lead 45 made of aluminum or the like is connected to the cathode 41, and an anode lead 46 made of nickel or the like is connected to the anode 42. The cathode lead 45 is welded to the safety valve mechanism 35 so as to be electrically connected to the battery cover 34, and the anode lead 46 is welded and electrically connected to the battery can 31.

The cathode 41 is formed by arranging a cathode active material layer 41B on both sides of a strip-shaped cathode current collector 41A. The anode 42 has the same configuration as that of the above-described anode, and is formed, for example, by arranging an anode active material layer 42B on both sides of a strip-shaped anode current collector 42A. The configurations of the cathode current collector 41A, the cathode active material layer 41B, the anode current collector 42A, the anode active material layer 42B and the separator 43, and the composition of the electrolytic solution are the same as the configurations of the cathode current collector 21A, the cathode active material layer 21B, the anode current collector 22A, the anode active material layer 22B and the separator 23, and the composition of the electrolytic solution in the first secondary battery, respectively.

The secondary battery is manufactured by the following steps, for example.

At first, the cathode 41 in which the cathode active material layer 41B is arranged on both sides of the cathode current collector 41A, and the anode 42 in which the anode active material layer 42B is arranged on both sides of the anode current collector 42A are formed by the same steps as the above-described steps of forming the cathode 21 and the anode 22 in the first secondary battery. Next, the cathode lead 45 is attached to the cathode 41, and the anode lead 46 is attached to the anode 42. Then, the cathode 41 and the anode 42 are spirally wound with the separator 43 in between to form the spirally wound electrode body 40, and an end of the cathode lead 45 is welded to the safety valve mechanism 35, and an end of the anode lead 46 is welded to eth battery can 31, and then the spirally wound electrode body 40 sandwiched between the pair of insulating plates 32 and 33 is contained in the battery can 31. Next, the electrolytic solution is injected into the battery can 31 so that the separator 43 is impregnated with the electrolytic solution. Finally, the battery cover 34, the safety valve mechanism 35 and the PTC device 36 are fixed in an open end of the battery can 31 by caulking by the gasket 37. Thereby, the secondary battery shown in FIGS. 7 and 8 is completed.

When the secondary battery is charged, for example, lithium ions are extracted from the cathode 41, and are inserted into the anode 42 through the electrolytic solution. On the other hand, when the secondary battery is discharged, for example, the lithium ions are extracted from the anode 42 and are inserted into the cathode 41 through the electrolytic solution.

In the cylindrical secondary battery, the anode 42 has the same configuration as that of the above-described anode, so the cycle characteristics may be improved. The effects of the secondary battery except for the above-described effects are the same as those of the first secondary battery.

(Third Secondary Battery)

Figure 9:
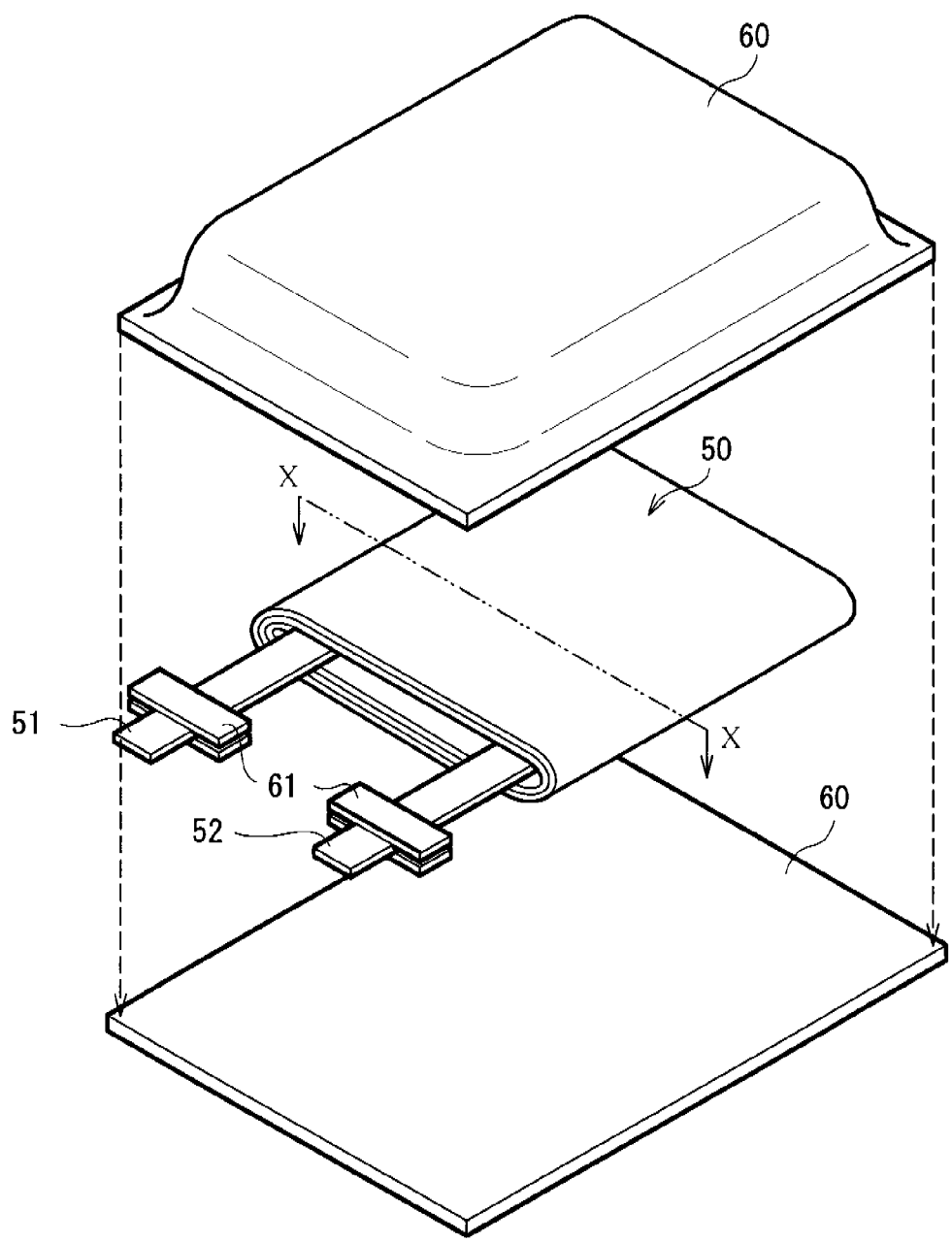
FIG. 9 is a sectional view showing the configuration of a third secondary battery including the anode according to the embodiment of the invention.
Figure 10:
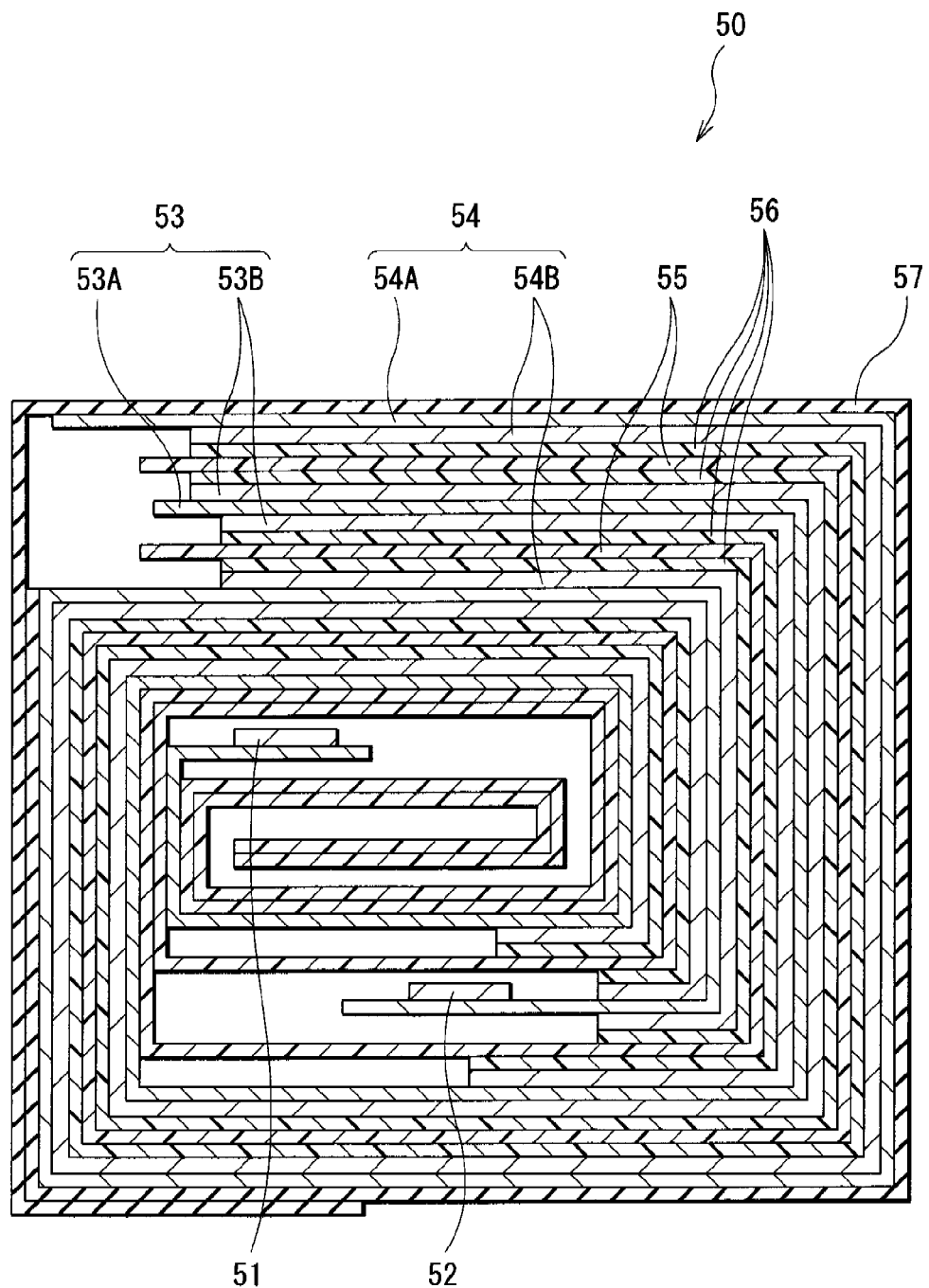
FIG. 10 is a sectional view of a spirally wound electrode body taken along a line X-X of FIG. 9.

FIG. 9 shows an exploded perspective view of a third secondary battery, and FIG. 10 shows an enlarged sectional view taken along a line X-X of FIG. 9. In the secondary battery, a spirally wound electrode body 50 to which a cathode lead 51 and an anode lead 52 are attached is contained in film-shaped package members 60, and the configuration of the battery including the package members 60 is a so-called laminate film type.

The cathode lead 51 and the anode lead 52 are drawn, for example, from the interiors of the package members 60 to outside in the same direction. The cathode lead 51 is made of, for example, a metal material such as aluminum, and the anode lead 52 are made of, for example, a metal material such as copper, nickel or stainless. The metal materials of which the cathode lead 51 and the anode lead 52 are made each have a sheet shape or a mesh shape.

The package members 60 are made of, for example, an aluminum laminate film including a nylon film, aluminum foil and a polyethylene film which are bonded in this order. The package members 60 are arranged so that the polyethylene film of each of the package members 60 faces the spirally wound electrode body 50, and edge portions of two rectangular aluminum laminate films are adhered to each other by fusion bonding or an adhesive.

An adhesive film 61 is inserted between the package members 60 and the cathode lead 51 and the anode lead 52 for preventing the entry of outside air. The adhesive film 61 is made of, for example, a material having adhesion to the cathode lead 51 and the anode lead 52, for example, a polyolefin resin such as polyethylene, polypropylene, modified polyethylene or modified polypropylene.

In addition, the package members 60 may be made of a laminate film with any other configuration, a polymer film such as polypropylene or a metal film instead of the above-described aluminum laminate film.

The spirally wound electrode body 50 is formed by laminating a cathode 53 and an anode 54 with a separator 55 and an electrolyte 56 in between, and then spirally winding them, and an outermost portion of the spirally wound electrode body 50 is protected with a protective tape 57.

The cathode 53 is formed by arranging a cathode active material layer 53B on both sides of a cathode current collector 53A having a pair of surfaces. The anode 54 has the same configuration as that of the above-described anode, and the anode 54 is formed by arranging an anode active material layer 54B on both sides of a strip-shaped anode current collector 54A. The configurations of the cathode current collector 53A, the cathode active material layer 53B, the anode current collector 54A, the anode active material layer 54B and the separator 55 are the same as those of the cathode current collector 21A, the cathode active material layer 21B, the anode current collector 22A, the anode active material layer 22B and the separator 23 in the first secondary battery.

The electrolyte 56 includes an electrolytic solution and a polymer compound holding the electrolytic solution, and is a so-called gel electrolyte. The gel electrolyte is preferable, because the gel electrolyte is capable of obtaining high ionic conductivity (for example, 1 mS/cm or over at room temperature), and leakage of an electrolyte from the secondary battery is prevented. The electrolyte 56 is arranged, for example, between the cathode 53 and the separator 55 and between the anode 54 and the separator 55.

Examples of the polymer compound include polyacrylonitrile, polyvinylidene fluoride, a copolymer of polyvinylidene fluoride and polyhexafluoropyrene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acids, polymethacrylic acids, styrene-butadiene rubber, nitrile-butadiene rubber, polystyrene, polycarbonate and the like. Only one kind or a mixture of a plurality of kinds selected from them may be used. Among them, as the polymer compound, polyacrylonitrile, polyvinylidene fluoride, polyhexafluoropropylene or polyethylene oxide is preferable, because they are electrochemically stable.

The composition of the electrolytic solution is the same as the composition of the electrolytic solution in the first secondary battery. However, the solvent in this case means a wide concept including not only a liquid solvent but also a solvent having ionic conductivity capable of dissociating the electrolyte salt. Therefore, in the case where a polymer compound having ionic conductivity is used, the polymer compound is included in the concept of the solvent.

In addition, instead of the gel electrolyte 56 in which the polymer compound holds the electrolytic solution, the electrolytic solution may be used as it is. In this case, the separator 55 is impregnated with the electrolytic solution.

The secondary battery including the gel electrolyte 56 is manufactured by the following steps, for example.

At first, the cathode 53 in which the cathode active material layer 53B is arranged on both sides of the cathode current collector 53A and the anode 54 in which the anode active material layer 54B is arranged on both sides of the anode current collector 54A are formed by the same steps as the above-described steps of forming the cathode 21 and the anode 22 in the first secondary battery. Next, the gel electrolyte 56 is formed by preparing a precursor solution including the electrolytic solution, the polymer compound and a solvent, applying the precursor solution to the cathode 53 and the anode 54, and volatilizing the solvent. Next, the cathode lead 51 and the anode lead 52 are attached to the cathode current collector 53A and the anode current collector 54A, respectively. Next, after the cathode 53 on which the electrolyte 56 is formed and the anode 54 on which the electrolyte 56 is formed are laminated with the separator 55 in between to form a laminate, the laminate is spirally wound in a longitudinal direction, and the protective tape 57 is bonded to an outermost portion of the laminate so as to form the spirally wound electrode body 50. Then, for example, the spirally wound electrode body 50 is sandwiched between the package members 60, and edge portions of the package members 60 are adhered to each other by thermal fusion bonding or the like to seal the spirally wound electrode body 50 in the package members 60. At this time, the adhesive film 61 is inserted between the cathode lead 51 and the anode lead 52, and the package members 60. Thereby, the secondary battery shown in FIGS. 9 and 10 is completed.

The above-described secondary battery may be manufactured by the following steps. At first, after the cathode lead 51 and the anode lead 52 are attached to the cathode 53 and the anode 54, respectively, the cathode 53 and the anode 54 are laminated with the separator 55 in between to form a laminate, and the laminate is spirally wound, and the protective tape 57 is bonded to an outermost portion of the spirally wound laminate so as to form a spirally wound body as a precursor body of the spirally wound electrode body 50. Next, the spirally wound body is sandwiched between the package members 60, and the edge portions of the package members 60 except for edge portions on one side are adhered by thermal fusion bonding or the like to form a pouched package, thereby the spirally wound body is contained in the package members 60. An electrolytic composition which includes the electrolytic solution, monomers as materials of a polymer compound and a polymerization initiator and, if necessary, any other material such as a polymerization inhibitor is prepared, and the electrolytic composition is injected into the package members 60, and then an opened portion of the package members 60 are sealed by thermal fusion bonding or the like. Finally, the monomers are polymerized by applying heat to form the polymer compound, thereby the gel electrolyte 56 is formed. Thus, the secondary battery shown in FIGS. 9 and 10 is completed.

In the laminate film type secondary battery, the anode 54 has the same configuration as that of the above-described anode, so the cycle characteristics may be improved. The effects of the secondary battery except for the above-described effects are the same as those of the first secondary battery.

EXAMPLES

Examples of the invention will be described in detail below.

Example 1-1

A laminate film type secondary battery shown in FIGS. 9 and 10 was manufactured by the following steps. At that time, the laminate film type secondary battery was a lithium-ion secondary battery in which the capacity of the anode 54 is represented based on insertion and extraction of lithium.

At first, the cathode 53 was formed. After lithium carbonate ($Li_2CO_3$) and cobalt carbonate ($CoCO_3$) were mixed at a molar ratio of 0.5:1, the mixture was fired in air at 900° C. for 5 hours to obtain a lithium-cobalt complex oxide ($LiCoO_2$). Next, after 91 parts by weight of the lithium-cobalt complex oxide as a cathode active material, 6 parts by weight of graphite as an electrical conductor and 3 parts by weight of polyvinylidene fluoride as a binder were mixed to form a cathode mixture, the cathode mixture was dispersed in N-methyl-2-pyrrolidone to form paste-form cathode mixture slurry. Finally, after the cathode mixture slurry was uniformly applied to both sides of the cathode current collector 53A made of strip-shaped aluminum foil (with a thickness of 12 μm), and was dried, the cathode mixture slurry was compression molded by a roller press to form the cathode active material layer 53B.

Next, the anode 54 was formed. At first, after the anode current collector 54A made of electrolytic copper foil (with a thickness of 18 μm and a ten-point height of roughness profile Rz of 3.5 μm) was prepared, silicon was deposited on both sides of the anode current collector 54A by an electron beam evaporation method using a deflection electron beam evaporation source while continuously introducing an oxygen gas and, if necessary, water vapor into a chamber, thereby a plurality of anode active material particles were formed so as to have a single-layer configuration (with a thickness of 5.8 μm). At that time, as the evaporation source, silicon with a purity of 99% was used, and the deposition rate was 10 nm/s, and the oxygen content in the anode active material particles was 3 at %. Finally, silicon oxide ($SiO_2$) was deposited by a liquid-phase deposition method to form an oxide-containing film, thereby the anode active material layer 54B was formed. In the case where the oxide-containing film was formed, after a dissolved species easily coordinating fluorine as an anion trapping agent was added to and mixed with a solution of a fluoride complex of silicon to form a mixture, the anode current collector 54A on which the anode active material was formed was immersed in the mixture, and a fluorine anion generated from the fluoride complex is trapped by the dissolved species, thereby an oxide was deposited on the surface of the anode active material. At that time, the deposition time of the oxide (the amount of the oxide-containing film intruded into small pores) was adjusted so that the volumetric capacity of the small pore group per unit weight of silicon was 0.2 $cm^3/g$. The volumetric capacity of the small pore group per unit weight of silicon was determined by a value (the weight of silicon as the anode active material) determined by subtracting the weight of the anode current collector 54A from the total weight of the anode current collector 54A on which the anode active material was formed, and the value (the volumetric capacity of the small pore group) of the amount of mercury intruded into pores with a diameter ranging from 3 nm to 50 nm both inclusive which was measured by a mercury porosimeter of Micromeritics (AutoPore 9500 series).

Next, the cathode lead 51 made of aluminum was attached to an end of the cathode current collector 53A by welding, and the anode lead 52 made of nickel was attached to an end of the anode current collector 54A by welding. Then, after the cathode 53, a three-layer configuration polymer separator 55 (with a thickness of 23 μm) formed by sandwiching a film made of porous polyethylene as a main component between films made of porous polypropylene as a main component, the anode 54, and the above-described polymer separator 55 were laminated in this order to form a laminate, and the laminate was spirally wound in a longitudinal direction, an outermost portion of the laminate was fixed by the protective tape 57 made of an adhesive tape to form a spirally wound body as a precursor body of the spirally wound electrode body 50. Next, after the spirally wound body was sandwiched between package members 60 made of a laminate film (with a total thickness of 100 μm) with a three-layer configuration formed by laminating nylon (with a thickness of 30 μm), aluminum (with a thickness of 40 μm) and cast polypropylene (with a thickness of 30 μm) in order from outside, the edge portions of the package members 60 except for edge portions on one side were adhered by thermal fusion bonding to form a pouched package, thereby the spirally wound body was contained in the package members 60. Next, the electrolytic solution was injected into the package members 60 from an opened portion of the package members 60, and the separator 55 was impregnated with the electrolytic solution, thereby the spirally wound electrode body 50 was formed.

To form the electrolytic solution, a mixture solvent formed by mixing ethylene carbonate (EC) and diethyl carbonate (DEC) was used as the solvent, and lithium hexafluorophosphate ($LiPF_6$) was used as the electrolyte salt. At that time, the composition of the mixture solvent (EC:DEC) had a weight ratio of 50:50, and the concentration of the electrolyte salt was 1 mol/kg.

Finally, the opened portion of the package members 60 were sealed by thermal fusion bonding in a vacuum atmosphere, thereby a laminate film type secondary battery was completed. In the secondary battery, the thickness of the cathode active material layer 53B was adjusted so that the charge-discharge capacity of the anode 54 was larger than the charge-discharge capacity of the cathode 53, thereby the deposition of lithium metal on the anode 54 when the secondary battery was fully charged was prevented.

Examples 1-2 to 1-14

Secondary batteries were formed by the same steps as those in Example 1-1, except that instead of 0.2 $cm^3/g$, the volumetric capacity of the small pore group per unit weight of silicon was 0.1 $cm^3/g$ (Example 1-2), 0.09 $cm^3/g$ (Example 1-3), 0.08 $cm^3/g$ (Example 1-4), 0.07 $cm^3/g$ (Example 1-5), 0.06 $cm^3/g$ (Example 1-6), 0.05 $cm^3/g$ (Example 1-7), 0.04 $cm^3/g$ (Example 1-8), 0.03 $cm^3/g$ (Example 1-9), 0.02 $cm^3/g$ (Example 1-10), 0.01 $cm^3/g$ (Example 1-11), 0.005 $cm^3/g$ (Example 1-12), 0.001 $cm^3/g$ (Example 1-13), or 0 $cm^3/g$ (Example 1-14).

Comparative Example 1-1

A secondary battery was formed by the same steps as those in Example 1-1, except that the oxide-containing film was not formed. In this case, the volumetric capacity of the small pore group per unit weight of silicon was 0.4 $cm^3/g$.

Comparative Examples 1-2, 1-3

Secondary batteries were formed by the same steps as those in Example 1-1, except that the volumetric capacity of the small pore group per unit weight of silicon was 0.35 cm$^3$/g (Comparative Example 1-2) or 0.3 cm$^3$/g (Comparative Example 1-3).

Figure 11:
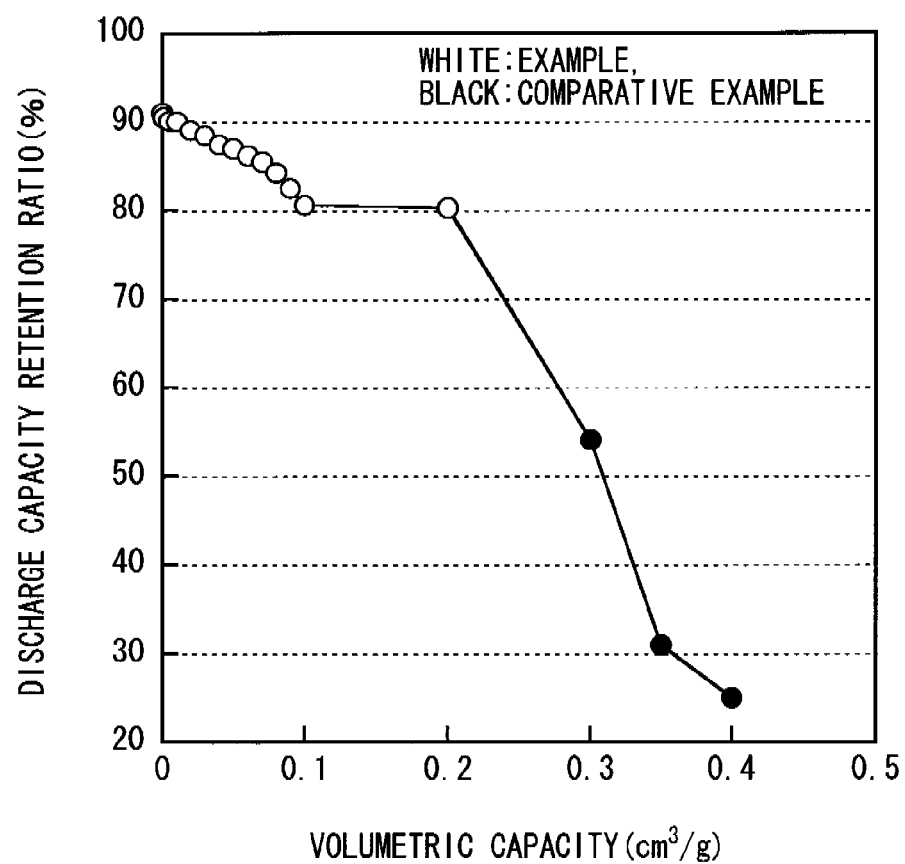
FIG. 11 is a diagram showing a correlation between a volumetric capacity and a discharge capacity retention ratio.

When the cycle characteristics of the secondary batteries of Examples 1-1 to 1-14 and Comparative Examples 1-1 to 1-3 were determined, results shown in Table 1 and FIG. 11 were obtained.

To determine the cycle characteristics, a cycle test was performed by the following steps to determine the discharge capacity retention ratio of each of the secondary batteries. At first, to stabilize the battery state of the secondary battery, after one cycle of charge and discharge was performed on the secondary battery in an atmosphere of 23° C., the secondary battery was charged and discharged again to determine the discharge capacity in the second cycle. Next, 99 cycles of charge and discharge were performed on the secondary battery in the same atmosphere to determine the discharge capacity in the 101st cycle. Finally, the discharge capacity retention ratio (%)=(discharge capacity in the 101st cycle/discharge capacity in the second cycle)×100 was determined by calculation. As the condition of charge, after the secondary battery was charged at a constant current density of 3 mA/cm$^2$ until the battery voltage reached 4.2 V, the secondary battery was charged at a constant voltage of 4.2 V until the current density reached 0.3 mA/cm$^2$. Moreover, as the condition of discharge, the secondary battery was discharged at a constant current density of 3 mA/cm$^2$ until the battery voltage reached 2.5 V.

In addition, the same steps and the same conditions as the above-described steps and the above-described conditions were used to determine the cycle characteristics of secondary batteries of the following examples and the following comparative examples.

As shown in Table 1 and FIG. 11, in the case where silicon oxide was formed as the oxide-containing film by a liquid-phase deposition method, the smaller the volumetric capacity of the small pore group per unit weight of silicon was, the higher the discharge capacity retention ratio became. The result indicated that when the oxide-containing film was intruded into pores, the surface area of the anode active material was reduced, so the electrolytic solution was resistant to decomposition during charge and discharge. In this case, in Examples 1-1 to 1-14 in which the volumetric capacity was 0.2 cm$^3$/g or less, the discharge capacity retention ratio was much higher than that in Comparative Examples 1-1 to 1-3 in which the volumetric capacity was out of the range. In particular, when the volumetric capacity was 0.05 cm$^3$/g or less, the discharge capacity retention ratio was higher, and when the volumetric capacity was 0 cm$^3$/g, the discharge capacity retention ratio was at maximum. Therefore, it was confirmed that in the secondary battery according to the embodiment of the invention, in the case where the oxide-containing film was formed together with the anode active material including silicon, when the volumetric capacity of the small pore group per unit weight of silicon was 0.2 cm$^3$/g or less, the cycle characteristics were improved. In this case, it was confirmed that when the volumetric capacity was 0.05 cm$^3$/g or less, or more specifically 0 cm$^3$/g, a higher effect was obtained.

Examples 2-1 to 2-9

Secondary batteries were formed by the same steps as those in Examples 1-1, 1-2, 1-4, 1-7 and 1-10 to 1-14, except

TABLE 1

Anode active material: silicon (electron beam evaporation)
Ten-point height of roughness profile Rz = 3.5 μm
Oxygen content in anode active material = 3 at %

| | ANODE ACTIVE MATERIAL LAYER | OXIDE-CONTAINING FILM | | VOLUMETRIC CAPACITY (cm$^3$/g) | DISCHARGE CAPACITY RETENTION RATIO (%) |
|---|---|---|---|---|---|
| | NUMBER (LAYER) | KIND | FORMING METHOD | | |
| EXAMPLE 1-1 | 1 | SiO$_2$ | LIQUID-PHASE DEPOSITION | 0.2 | 80.3 |
| EXAMPLE 1-2 | | | | 0.1 | 80.6 |
| EXAMPLE 1-3 | | | | 0.09 | 82.5 |
| EXAMPLE 1-4 | | | | 0.08 | 84.2 |
| EXAMPLE 1-5 | | | | 0.07 | 85.5 |
| EXAMPLE 1-6 | | | | 0.06 | 86.2 |
| EXAMPLE 1-7 | | | | 0.05 | 87 |
| EXAMPLE 1-8 | | | | 0.04 | 87.4 |
| EXAMPLE 1-9 | | | | 0.03 | 88.5 |
| EXAMPLE 1-10 | | | | 0.02 | 89 |
| EXAMPLE 1-11 | | | | 0.01 | 90 |
| EXAMPLE 1-12 | | | | 0.005 | 90.1 |
| EXAMPLE 1-13 | | | | 0.001 | 90.5 |
| EXAMPLE 1-14 | | | | 0 | 91 |
| COMPARATIVE EXAMPLE 1-1 | 1 | — | — | 0.4 | 25 |
| COMPARATIVE EXAMPLE 1-2 | | SiO$_2$ | LIQUID-PHASE DEPOSITION | 0.35 | 31 |
| COMPARATIVE EXAMPLE 1-3 | | | | 0.3 | 54 | that while the anode current collector 54A was moved back and forth relatively to an evaporation source, silicon was deposited six times to be laminated, thereby the anode active material had a six-layer configuration. At that time, the deposition rate was 100 nm/s.

Comparative Example 2

A secondary battery was formed by the same steps as those in Comparative Example 1-3, except that as in the case of Examples 2-1 to 2-9, the anode active material had a six-layer configuration.

Figure 12:
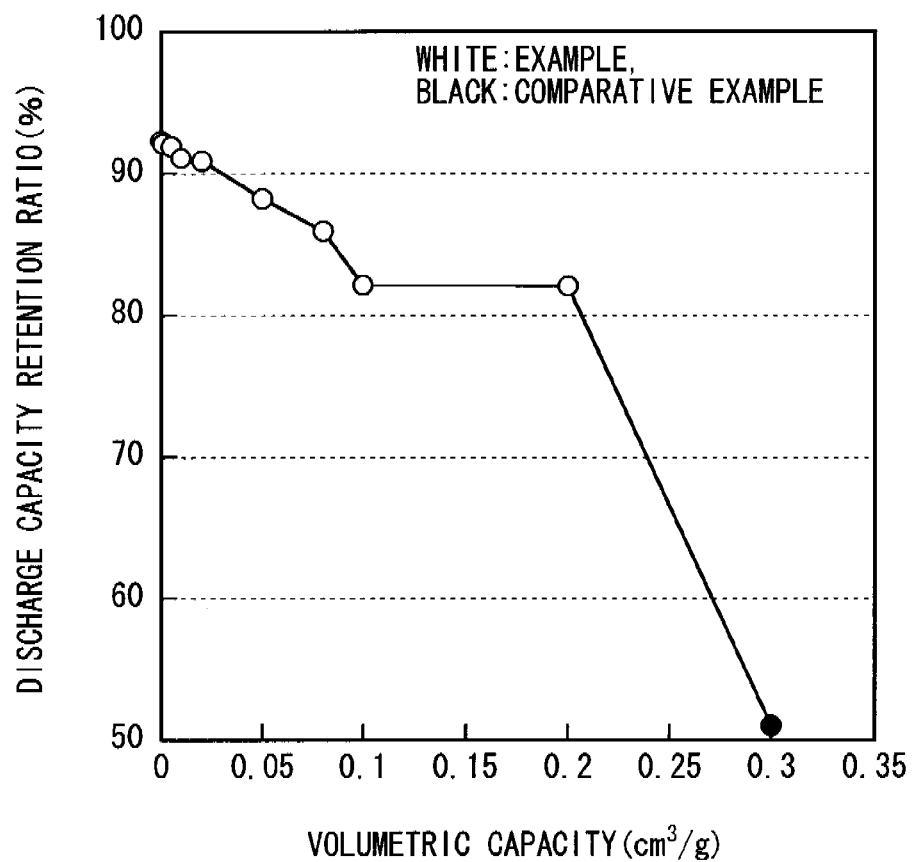
FIG. 12 is a diagram showing another correlation between a volumetric capacity and a discharge capacity retention ratio.

When the cycle characteristics of the secondary batteries of Examples 2-1 to 2-9 and Comparative Example 2 were determined, results shown in Table 2 and FIG. 12 were obtained.

Examples 3-1 to 3-6

Secondary batteries were formed by the same steps as those in Examples 2-1, 2-2, 2-4, 2-5, 2-7 and 2-9, except that instead of the solution of the fluoride complex of silicon, a solution of a fluoride complex of germanium was used, and instead of silicon oxide, germanium oxide ($GeO_2$) was formed as the oxide-containing film.

Comparative Example 3

A secondary battery was formed by the same steps as those in Comparative Example 2, except that as in the case of Examples 3-1 to 3-6, germanium oxide was formed as the oxide-containing film.

Examples 4-1 to 4-6

Secondary batteries were formed by the same steps as those in Examples 2-1, 2-2, 2-4, 2-5, 2-7 and 2-9, except that

TABLE 2

Anode active material: silicon (electron beam evaporation)
Ten-point height of roughness profile Rz = 3.5 μm
Oxygen content in anode active material = 3 at %

| | ANODE ACTIVE MATERIAL LAYER | OXIDE-CONTAINING FILM | | VOLUMETRIC | DISCHARGE CAPACITY RETENTION |
|---|---|---|---|---|---|
| | NUMBER (LAYER) | KIND | FORMING METHOD | CAPACITY ($cm^3/g$) | RATIO (%) |
| EXAMPLE 2-1 | 6 | $SiO_2$ | LIQUID-PHASE DEPOSITION | 0.2 | 82 |
| EXAMPLE 2-2 | | | | 0.1 | 82.1 |
| EXAMPLE 2-3 | | | | 0.08 | 85.9 |
| EXAMPLE 2-4 | | | | 0.05 | 88.2 |
| EXAMPLE 2-5 | | | | 0.02 | 90.9 |
| EXAMPLE 2-6 | | | | 0.01 | 91.1 |
| EXAMPLE 2-7 | | | | 0.005 | 91.9 |
| EXAMPLE 2-8 | | | | 0.001 | 92.1 |
| EXAMPLE 2-9 | | | | 0 | 92.3 |
| COMPARATIVE EXAMPLE 2 | 6 | $SiO_2$ | LIQUID-PHASE DEPOSITION | 0.3 | 51 |

As shown in Table 2 and FIG. 12, in Examples 2-1 to 2-9 in which the anode active material had a six-layer configuration, the same results as those in Examples 1-1 to 1-14 in which the anode active material had a single-layer configuration were obtained. More specifically, in Examples 2-1 to 2-9 in which the volumetric capacity of the small pore group per unit weight of silicon was 0.2 $cm^3/g$ or less, the discharge capacity retention ratio was much higher than that in Comparative Example 2 in which the volumetric capacity was out of the range, and when the volumetric capacity was 0.05 $cm^3/g$ or less, or more specifically 0 $cm^3/g$, the discharge capacity retention ratio became higher. Therefore, it was confirmed that in the secondary battery according to the embodiment of the invention, even if the number of layers of the anode active material was changed, the cycle characteristics were improved.

instead of the solution of the fluoride complex of silicon, a solution of a fluoride complex of tin was used, and instead of silicon oxide, tin oxide ($SnO_2$) was formed as the oxide-containing film.

Comparative Example 4

A secondary battery was formed by the same steps as those in Comparative Example 2, except that as in the case of Examples 4-1 to 4-6, tin oxide was formed as the oxide-containing film.

When the cycle characteristics of the secondary batteries of Examples 3-1 to 3-6 and 4-1 to 5-6 and Comparative Examples 3 and 4 were determined, results shown in Tables 3 and 4 were obtained.

TABLE 3

Anode active material: silicon (electron beam evaporation)
Ten-point height of roughness profile Rz = 3.5 μm
Oxygen content in anode active material = 3 at %

|  | ANODE ACTIVE MATERIAL LAYER | OXIDE-CONTAINING FILM | | VOLUMETRIC CAPACITY ($cm^3/g$) | DISCHARGE CAPACITY RETENTION RATIO (%) |
| --- | --- | --- | --- | --- | --- |
|  | NUMBER (LAYER) | KIND | FORMING METHOD | | |
| EXAMPLE 3-1 | 6 | $GeO_2$ | LIQUID-PHASE DEPOSITION | 0.2 | 80.1 |
| EXAMPLE 3-2 | | | | 0.1 | 80.5 |
| EXAMPLE 3-3 | | | | 0.05 | 84.6 |
| EXAMPLE 3-4 | | | | 0.02 | 86.1 |
| EXAMPLE 3-5 | | | | 0.005 | 88.5 |
| EXAMPLE 3-6 | | | | 0 | 88.9 |
| COMPARATIVE EXAMPLE 3 | 6 | $GeO_2$ | LIQUID-PHASE DEPOSITION | 0.3 | 49.4 |

TABLE 4

Anode active material: silicon (electron beam evaporation)
Ten-point height of roughness profile Rz = 3.5 μm
Oxygen content in anode active material = 3 at %

|  | ANODE ACTIVE MATERIAL LAYER | OXIDE-CONTAINING FILM | | VOLUMETRIC CAPACITY ($cm^3/g$) | DISCHARGE CAPACITY RETENTION RATIO (%) |
| --- | --- | --- | --- | --- | --- |
|  | NUMBER (LAYER) | KIND | FORMING METHOD | | |
| EXAMPLE 4-1 | 6 | $SnO_2$ | LIQUID-PHASE DEPOSITION | 0.2 | 80 |
| EXAMPLE 4-2 | | | | 0.1 | 80.2 |
| EXAMPLE 4-3 | | | | 0.05 | 84.2 |
| EXAMPLE 4-4 | | | | 0.02 | 85.9 |
| EXAMPLE 4-5 | | | | 0.005 | 88 |
| EXAMPLE 4-6 | | | | 0 | 88.6 |
| COMPARATIVE EXAMPLE 4 | 6 | $SnO_2$ | LIQUID-PHASE DEPOSITION | 0.3 | 49.1 |

As shown in Tables 3 and 4, in Examples 3-1 to 3-6 and 4-1 to 4-6 in which germanium oxide or tin oxide was formed by a liquid-phase deposition method as the oxide-containing film, the same results as those in Examples 1-1 to 1-14 were obtained. More specifically, in Examples 3-1 to 3-6 and 4-1 to 4-6 in which the volumetric capacity of the small pore group per unit weight of silicon was 0.2 $cm^3/g$ or less, the discharge capacity retention ratio was much higher than that in Comparative Examples 3 and 4 in which the volumetric capacity was out of the range, and when the volumetric capacity was 0.05 $cm^3/g$ or less, or more specifically 0 $cm^3/g$, the discharge capacity retention ratio became higher. In this case, there was a tendency that in the case where the silicon oxide was formed, the discharge capacity retention ratio became higher. Therefore, it was confirmed that in the secondary battery according to the embodiment of the invention, even if the kind of the oxide-containing film was changed, the cycle characteristics were improved, and when the silicon oxide was used, a higher effect was obtained.

Examples 5-1 to 5-3

Secondary batteries were formed by the same steps as those in Example 2-5, except that instead of the liquid-phase deposition method, a sol-gel method (Example 5-1), a coating method (Example 5-2) or a dip coating method (Example 5-3) was used as the method of forming the oxide-containing film.

When the secondary batteries of Examples 5-1 to 5-3 were determined, results shown in Table 5 were obtained. In Table 5, the results of Example 2-5 and Comparative Example 2 are also shown.

TABLE 5

Anode active material: silicon (electron beam evaporation)
Ten-point height of roughness profile Rz = 3.5 μm
Oxygen content in anode active material = 3 at %

| | ANODE ACTIVE MATERIAL LAYER | OXIDE-CONTAINING FILM | | VOLUMETRIC CAPACITY ($cm^3/g$) | DISCHARGE CAPACITY RETENTION RATIO (%) |
|---|---|---|---|---|---|
| | NUMBER (LAYER) | KIND | FORMING METHOD | | |
| EXAMPLE 2-5 | 6 | $SiO_2$ | LIQUID-PHASE DEPOSITION | 0.02 | 90.9 |
| EXAMPLE 5-1 | | | SOL-GEL | | 89.1 |
| EXAMPLE 5-2 | | | COATING | | 88.2 |
| EXAMPLE 5-3 | | | DIP COATING | | 86.5 |
| COMPARATIVE EXAMPLE 2 | 6 | $SiO_2$ | LIQUID-PHASE DEPOSITION | 0.3 | 51 |

As shown in Table 5, in Examples 5-1 to 5-3 in which the oxide-containing film was formed by a sol-gel method or the like, as in the case of Example 2-5 in which the oxide-containing film was formed by a liquid-phase deposition method, the discharge capacity retention ratio was much higher than that in Comparative Example 2. In this case, there was a tendency that in the case where the liquid-phase deposition method was used, the discharge capacity retention ratio became higher. Therefore, it was confirmed that in the secondary battery according to the embodiment of the invention, even if the method of forming the oxide-containing film was changed, the cycle characteristics were improved, and when the liquid-phase deposition method was used, a higher effect was obtained.

Example 6-1

A secondary battery was formed by the same steps as those in Examples 2-1 to 2-9, except that after the anode active material was formed, instead of the oxide-containing film, a metal material not alloyed with lithium was formed. In the case where the metal material was formed, while air was supplied to a plating bath, cobalt was deposited on both sides of the anode current collector 54A by an electrolytic plating method. At that time, a cobalt plating solution of Japan Pure Chemical Co., Ltd. was used as a plating solution, and the current density was 2 $A/dm^2$ to 5 $A/dm^2$, and the plating rate was 10 nm/s. Moreover, the plating time was adjusted so that the volumetric capacity of the small pore group per unit weight of silicon was 0.2 $cm^3/g$.

Examples 6-2 to 6-6

Secondary batteries were formed by the same steps as those in Example 6-1, except that instead of 0.2 $cm^3/g$, the volumetric capacity of the small pore group per unit weight of silicon was 0.1 $cm^3/g$ (Example 6-2), 0.05 $cm^3/g$ (Example 6-3), 0.02 $cm^3/g$ (Example 6-4), 0.005 $cm^3/g$ (Example 6-5) or 0 $cm^3/g$ (Example 6-6).

Comparative Example 6

A secondary battery was formed by the same steps as those in Comparative Example 2, except that as in the case of Example 6-1, the metal material was formed.

When the cycle characteristics of the secondary batteries of Examples 6-1 to 6-6 and Comparative Example 6 were determined, results shown in Table 6 were obtained.

TABLE 6

Anode active material: silicon (electron beam evaporation)
Ten-point height of roughness profile Rz = 3.5 μm
Oxygen content in anode active material = 3 at %

| | ANODE ACTIVE MATERIAL LAYER | METAL MATERIAL | | VOLUMETRIC CAPACITY ($cm^3/g$) | DISCHARGE CAPACITY RETENTION RATIO (%) |
|---|---|---|---|---|---|
| | NUMBER (LAYER) | KIND | FORMING METHOD | | |
| EXAMPLE 6-1 | 6 | Co | ELECTROLYTIC PLATING | 0.2 | 80 |
| EXAMPLE 6-2 | | | | 0.1 | 80.2 |
| EXAMPLE 6-3 | | | | 0.05 | 85.2 |
| EXAMPLE 6-4 | | | | 0.02 | 88.1 |
| EXAMPLE 6-5 | | | | 0.005 | 89.8 |
| EXAMPLE 6-6 | | | | 0 | 90.2 |
| COMPARATIVE EXAMPLE 6 | 6 | Co | ELECTROLYTIC PLATING | 0.3 | 54 |

As shown in Table 6, in the case where cobalt was formed as the metal material by the electrolytic plating method, the same results as those in Examples 2-1 to 2-9 in which the oxide-containing film was formed were obtained. More specifically, in Examples 6-1 to 6-6 in which the volumetric capacity of the small pore group per unit weight of silicon was 0.2 cm$^3$/g or less, the discharge capacity retention ratio was much higher than that in Comparative Example 6 in which the volumetric capacity was out of the range, and when the volumetric capacity was 0.05 cm$^3$/g or less, or more specifically 0 cm$^3$/g, the discharge capacity retention ratio became higher. Therefore, it was confirmed that in the secondary battery according to the embodiment of the invention, in the case where the metal material was formed together with the anode active material including silicon, when the volumetric capacity of the small pore group per unit weight of silicon was 0.2 cm$^3$/g or less, the cycle characteristics were improved, and when the volumetric capacity was 0.05 cm$^3$/g or less, or more specifically 0 cm$^3$/g, a higher effect was obtained.

Examples 7-1 to 7-6

Secondary batteries were formed by the same steps as those in Examples 6-1 to 6-6, except that instead of the electrolytic plating method, the metal material was formed by an electroless plating method. At that time, as the plating solution, an electroless cobalt plating solution of Japan Pure Chemical Co., Ltd. was used, and the plating time was 60 minutes.

Comparative Example 7

A secondary battery was formed by the same steps as those in Comparative Example 2, except that as in the case of Examples 7-1 to 7-6, the metal material was formed by an electroless plating method.

When the cycle characteristics of the secondary batteries of Examples 7-1 to 7-6 and Comparative Example 7 were determined, results shown in Table 7 were obtained.

As shown in Table 7, in Examples 7-1 to 7-6 in which the metal material was formed by the electroless plating method, the same results as those in Examples 6-1 to 6-6 in which the metal material was formed by the electrolytic plating method were obtained. More specifically, in Examples 7-1 to 7-6 in which the volumetric capacity of the small pore group per unit weight of silicon was 0.2 cm$^3$/g or less, the discharge capacity retention ratio was much higher than that in Comparative Example 7 in which the volumetric capacity was out of the range, and when the volumetric capacity was 0.05 cm$^3$/g or less, or more specifically 0 cm$^3$/g, the discharge capacity retention ratio became higher. Therefore, it was confirmed that in the secondary battery according to the embodiment of the invention, even in the case where the method of forming the metal material was changed, the cycle characteristics were improved.

Examples 8-1 to 8-4

Secondary batteries were formed by the same steps as those in Example 6-4, except that as the material for forming the metal material, instead of the cobalt plating solution, a nickel plating solution (Example 8-1), an iron plating solution (Example 8-2), a zinc plating solution (Example 8-3) or a copper plating solution (Example 8-4) was used. At that time, the current density was 2 A/dm$^2$ to 10 A/dm$^2$ in the case where the nickel plating solution was used, 2 A/dm$^2$ to 5 A/dm$^2$ in the case where the iron plating solution was used, 1 A/dm$^2$ to 3 A/dm$^2$ in the case the zinc plating solution was used, and 2 A/dm$^2$ to 8 A/dm$^2$ in the case where the copper plating solution was used. The above-described plating solutions were of Japan Pure Chemical Co., Ltd.

When the cycle characteristics of the secondary batteries of Examples 8-1 to 8-4 were determined, results shown in Table 8 were obtained. In Table 8, the results of Example 6-4 and Comparative Example 6 are also shown.

TABLE 7

Anode active material: silicon (electron beam evaporation)
Ten-point height of roughness profile Rz = 3.5 μm
Oxygen content in anode active material = 3 at %

|  | ANODE ACTIVE MATERIAL LAYER | METAL MATERIAL | | VOLUMETRIC | DISCHARGE CAPACITY RETENTION |
| --- | --- | --- | --- | --- | --- |
|  | NUMBER (LAYER) | KIND | FORMING METHOD | CAPACITY (cm$^3$/g) | RATIO (%) |
| EXAMPLE 7-1 | 6 | Co | ELECTROLESS PLATING | 0.2 | 79.8 |
| EXAMPLE 7-2 | | | | 0.1 | 80 |
| EXAMPLE 7-3 | | | | 0.05 | 84.8 |
| EXAMPLE 7-4 | | | | 0.02 | 87 |
| EXAMPLE 7-5 | | | | 0.005 | 88.5 |
| EXAMPLE 7-6 | | | | 0 | 88.9 |
| COMPARATIVE EXAMPLE 7 | 6 | Co | ELECTROLESS PLATING | 0.3 | 50 |

TABLE 8

Anode active material: silicon (electron beam evaporation)
Ten-point height of roughness profile Rz = 3.5 μm
Oxygen content in anode active material = 3 at %

| | ANODE ACTIVE MATERIAL LAYER | METAL MATERIAL | | VOLUMETRIC CAPACITY ($cm^3/g$) | DISCHARGE CAPACITY RETENTION RATIO (%) |
|---|---|---|---|---|---|
| | NUMBER (LAYER) | KIND | FORMING METHOD | | |
| EXAMPLE 6-4 | 6 | Co | ELECTROLYTIC PLATING | 0.02 | 88.1 |
| EXAMPLE 8-1 | | Ni | | | 87.1 |
| EXAMPLE 8-2 | | Fe | | | 87.5 |
| EXAMPLE 8-3 | | Zn | | | 87.1 |
| EXAMPLE 8-4 | | Cu | | | 87.6 |
| COMPARATIVE EXAMPLE 6 | 6 | Co | ELECTROLYTIC PLATING | 0.3 | 54 |

As shown in Table 8, in Examples 8-1 to 8-4 in which nickel or the like was formed as the metal material, a discharge capacity retention ratio equivalent to that in Example 6-4 in which the cobalt was formed was obtained, and the discharge capacity retention ratio was much higher than that in Comparative Example 6. In this case, there was a tendency that in the case where cobalt was used as the metal material, the discharge capacity retention ratio was higher. Therefore, it was confirmed that in the secondary battery according to the embodiment of the invention, even in the case where the kind of the metal material was changed, the cycle characteristics were improved, and when cobalt was used as the metal material, a higher effect was obtained.

Examples 9-1 to 9-6

Secondary batteries were formed by the same steps as those in Example 2-5, except that instead of 3 at %, the oxygen content in the anode active material was 2 at % (Example 9-1), 10 at % (Example 9-2), 20 at % (Example 9-3), 30 at % (Example 9-4), 40 at % (Example 9-5), or 45 at % (Example 9-6).

Figure 13:
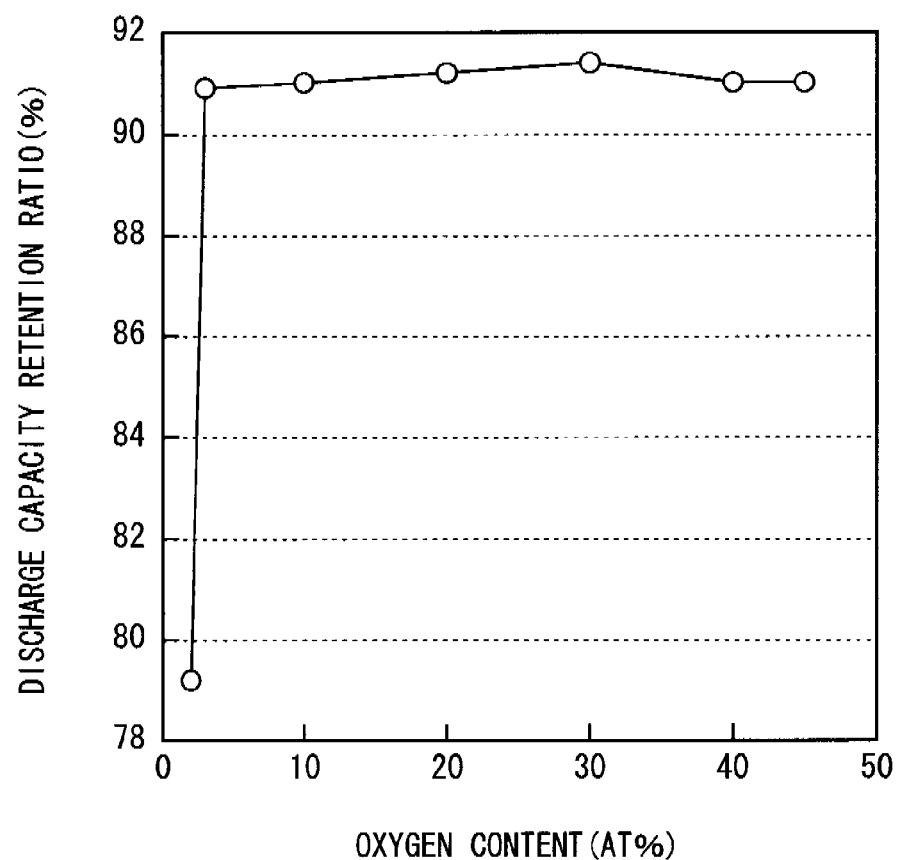
FIG. 13 is a diagram showing a correlation between the oxygen content and a discharge capacity retention ratio.

When the cycle characteristics of the secondary batteries of Examples 9-1 to 9-6 were determined, results shown in Table 9 and FIG. 13 were obtained. In Table 9, the results of Example 2-5 and Comparative Example 2 are also shown.

As shown in Table 9, in Examples 9-1 to 9-6 in which the oxygen content in the anode active material was different, as in the case of Example 2-5, the discharge capacity retention ratio was much higher than that in Comparative Example 2. In this case, as shown in Table 9 and FIG. 13, there was a tendency that as the oxygen content increased, the discharge capacity retention ratio was increased, and then decreased, and when the content was smaller than 3 at %, the discharge capacity retention ratio was largely reduced. However, the content was larger than 40 at %, a sufficient discharge capacity retention ratio was obtained, but the battery capacity was reduced. Therefore, it was confirmed that in the secondary battery according to the embodiment of the invention, even in the case where the oxygen content in the anode active material was changed, the cycle characteristics were improved, and when the content was within a range from 3 at % to 40 at % both inclusive, a higher effect was obtained.

Examples 10-1 to 10-3

Secondary batteries were formed by the same steps as those in Example 2-5, except that instead of the case where silicon was deposited while continuously introducing an

TABLE 9

Anode active material: silicon (electron beam evaporation)
Ten-point height of roughness profile Rz = 3.5 μm

| | ANODE ACTIVE MATERIAL | | OXIDE-CONTAINING FILM | | VOLUMETRIC CAPACITY ($cm^3/g$) | DISCHARGE CAPACITY RETENTION RATIO (%) |
|---|---|---|---|---|---|---|
| | LAYER NUMBER (LAYER) | OXYGEN CONTENT (at %) | KIND | FORMING METHOD | | |
| EXAMPLE 9-1 | 6 | 2 | $SiO_2$ | LIQUID-PHASE DEPOSITION | 0.02 | 79.2 |
| EXAMPLE 2-5 | | 3 | | | | 90.9 |
| EXAMPLE 9-2 | | 10 | | | | 91 |
| EXAMPLE 9-3 | | 20 | | | | 91.2 |
| EXAMPLE 9-4 | | 30 | | | | 91.4 |
| EXAMPLE 9-5 | | 40 | | | | 91 |
| EXAMPLE 9-6 | | 45 | | | | 91 |
| COMPARATIVE EXAMPLE 2 | 6 | 3 | $SiO_2$ | LIQUID-PHASE DEPOSITION | 0.3 | 51 | oxygen gas or the like into a chamber, thereby oxygen was included in the anode active material, silicon was deposited while intermittently introducing an oxygen gas or the like into a chamber, thereby the anode active material was formed so that a first oxygen-containing region and a second oxygen-containing region with a higher oxygen content than that in the first oxygen-containing region were alternately laminated. At that time, the oxygen content in the second oxygen-containing region was 3 at %, and the number of the second oxygen-containing regions was 2 (Example 10-1), 4 (Example 10-2) or 6 (Example 10-3).

When the cycle characteristics of the secondary batteries of Examples 10-1 to 10-3 were determined, results shown in Table 10 were obtained. In Table 10, the results of Example 2-5 and Comparative Example 2 are also shown.

invention, even in the case where the anode active material particles were formed so as to include the first and second oxygen-containing regions, the cycle characteristics were improved, and when the number of the second oxygen-containing regions increased, a higher effect was obtained.

Examples 11-1 to 11-6

Secondary batteries were formed by the same steps as those in Example 2-5, except that silicon with a purity of 99% and a metal element with a purity of 99.9% were used as evaporation sources to form the anode active material including silicon and the metal element. At that time, as the metal element, iron (Example 11-1), nickel (Example 11-2), molybdenum (Example 11-3), titanium (Example 11-4),

TABLE 10

Anode active material: silicon (electron beam evaporation)
Ten-point height of roughness profile Rz = 3.5 μm

| | ANODE ACTIVE MATERIAL | | OXIDE-CONTAINING FILM | | VOLUMETRIC CAPACITY ($cm^3/g$) | DISCHARGE CAPACITY RETENTION RATIO (%) |
|---|---|---|---|---|---|---|
| | LAYER NUMBER (LAYER) | NUMBER OF SECOND OXYGEN-CONTAINING REGIONS | KIND | FORMING METHOD | | |
| EXAMPLE 2-5 | 6 | — | $SiO_2$ | LIQUID-PHASE DEPOSITION | 0.02 | 90.9 |
| EXAMPLE 10-1 | | 2 | | | | 91.2 |
| EXAMPLE 10-2 | | 4 | | | | 91.6 |
| EXAMPLE 10-3 | | 6 | | | | 91.8 |
| COMPARATIVE EXAMPLE 2 | 6 | 3 | $SiO_2$ | LIQUID-PHASE DEPOSITION | 0.3 | 51 |

As shown in Table 10, in Examples 10-1 to 10-3 in which the anode active material included the first and second oxygen-containing regions, as in the case of Example 2-5, the discharge capacity retention ratio was much higher than that in Comparative Example 2. In this case, there was a tendency that the larger the number of the second oxygen-containing regions was, the higher the discharge capacity retention ratio became. Therefore, it was confirmed that in the secondary battery according to the embodiment of the chromium (Example 11-5) or cobalt (Example 11-6) was used. At that time, the amount of the metal element evaporated was adjusted so that the content of the metal element in the anode active material was 5 at %.

When the cycle characteristics of the secondary batteries of Examples 11-1 to 11-6 were determined, results shown in Table 11 were obtained. In Table 11, the results of Example 2-5 and Comparative Example 2 are also shown.

TABLE 11

Anode active material: silicon (electron beam evaporation)
Ten-point height of roughness profile Rz = 3.5 μm
Oxygen content in anode active material = 3 at %
Content of metal element in anode active material = 5 at %

| | ANODE ACTIVE MATERIAL | | OXIDE-CONTAINING FILM | | VOLUMETRIC CAPACITY ($cm^3/g$) | DISCHARGE CAPACITY RETENTION RATIO (%) |
|---|---|---|---|---|---|---|
| | LAYER NUMBER (LAYER) | METAL ELEMENT | KIND | FORMING METHOD | | |
| EXAMPLE 2-5 | 6 | — | $SiO_2$ | LIQUID-PHASE DEPOSITION | 0.02 | 90.9 |
| EXAMPLE 11-1 | | Fe | | | | 91.8 |
| EXAMPLE 11-2 | | Ni | | | | 91.5 |
| EXAMPLE 11-3 | | Mo | | | | 91.4 |
| EXAMPLE 11-4 | | Ti | | | | 91.6 |
| EXAMPLE 11-5 | | Cr | | | | 91.4 |
| EXAMPLE 11-6 | | Co | | | | 91.9 |
| COMPARATIVE EXAMPLE 2 | 6 | — | $SiO_2$ | LIQUID-PHASE DEPOSITION | 0.3 | 51 |

As shown in Table 11, in Examples 11-1 to 11-6 in which the anode active material included both of silicon and the metal element, as in the case of Example 2-5, the discharge capacity retention ratio was much higher than that in Comparative Example 2. In this case, there was a tendency that the discharge capacity retention ratio was higher than that in Example 2-5. Therefore, it was confirmed that in the secondary battery according to the embodiment of the invention, even in the case where the anode active material included the metal element, the cycle characteristics were improved, and when the metal element was included, a higher effect was obtained.

Example 12-1

A secondary battery was formed by the same steps as those in Example 2-5, except that instead of the electron beam evaporation method, the anode active material was formed by an RF magnetron sputtering method. At that time, silicon with a purity of 99.99% was used as a target, and the deposition rate was 0.5 n/s.

Example 12-2

A secondary battery was formed by the same steps as those in Example 2-5, except that instead of the electron beam evaporation method, the anode active material was formed by a CVD method. At that time, silane and argon were used as a material and an excitation gas, respectively, and the deposition rate and the substrate temperature were 1.5 nm/s and 200° C., respectively.

When the cycle characteristics of the secondary batteries of Examples 12-1 and 12-2 were determined, results shown in Table 12 were obtained. In Table 12, the results of Example 2-5 and Comparative Example 2 are also shown.

TABLE 12

| | Anode active material: silicon Ten-point height of roughness profile Rz = 3.5 μm Oxygen content in anode active material = 3 at % | | | | | |
|---|---|---|---|---|---|---|
| | ANODE ACTIVE MATERIAL LAYER NUMBER (LAYER) | FORMING METHOD | OXIDE-CONTAINING FILM KIND | FORMING METHOD | VOLUMETRIC CAPACITY ($cm^3/g$) | DISCHARGE CAPACITY RETENTION RATIO (%) |
| EXAMPLE 2-5 | 6 | ELECTRON BEAM EVAPORATION | $SiO_2$ | LIQUID-PHASE DEPOSITION | 0.02 | 90.9 |
| EXAMPLE 12-1 | | SPUTTERING | | | | 88.5 |
| EXAMPLE 12-2 | | CVD | | | | 87.9 |
| COMPARATIVE EXAMPLE 2 | 6 | ELECTRON BEAM EVAPORATION | $SiO_2$ | LIQUID-PHASE DEPOSITION | 0.3 | 51 |

As shown in Table 12, in Examples 12-1 and 12-2 in which the method of forming the anode active material was different, as in the case of Example 2-5, the discharge capacity retention ratio was much higher than that in Comparative Example 2. In this case, there was a tendency that the discharge retention ratio was higher in order of the CVD method, the sputtering method and the electron beam evaporation method as the method of forming the anode active material. Therefore, it was confirmed that in the secondary battery according to the embodiment of the invention, even in the case where the method of forming the anode active material was changed, the cycle characteristics were improved, and when the evaporation method was used, a higher effect was obtained.

Examples 13-1 to 13-7

Secondary batteries were formed by the same steps as those in Example 2-5, except that instead of 3.5 μm, the ten-point height of roughness profile Rz of the surface of the anode current collector 54A was 1 μm (Example 13-1), 1.5 μm (Example 13-2), 2.5 μm (Example 13-3), 4.5 μm (Example 13-4), 5.5 μm (Example 13-5), 6.5 μm (Example 13-6) or 7 μm (Example 13-7).

Figure 14:
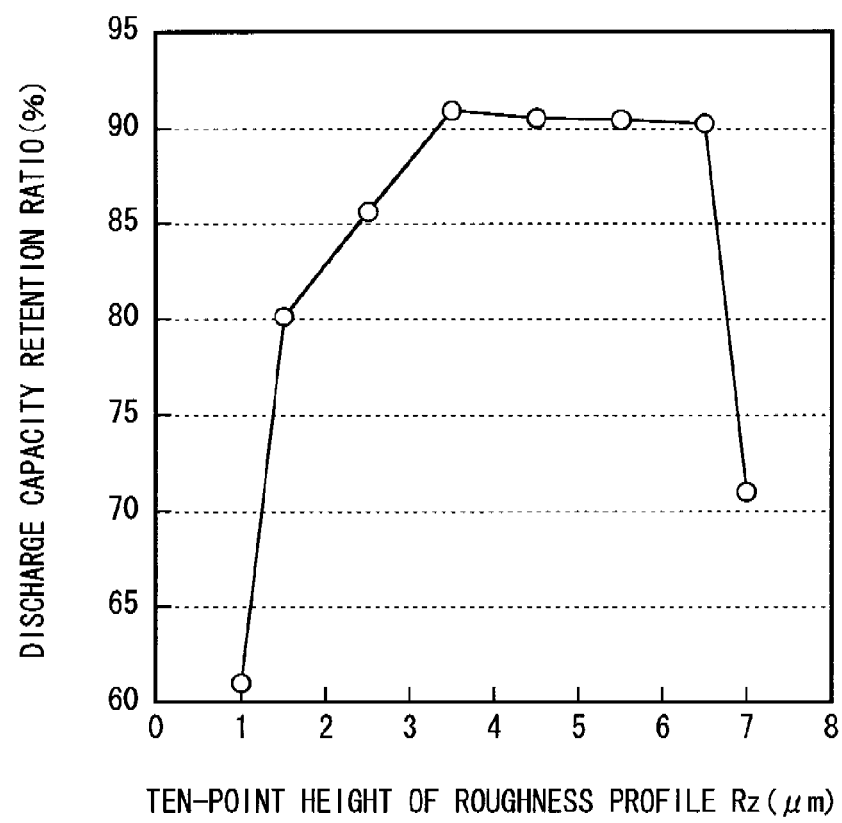
FIG. 14 is a diagram showing a correlation between a ten-point height of roughness profile and a discharge capacity retention ratio.

When the cycle characteristics of the secondary batteries of Examples 13-1 to 13-7 were determined, results shown in Table 13 and FIG. 14 were obtained. In Table 13, the results of Example 2-5 and Comparative Example 2 are also shown.

TABLE 13

Anode active material: silicon (electron beam evaporation)
Oxygen content in anode active material = 3 at %

|  | ANODE ACTIVE MATERIAL LAYER NUMBER (LAYER) | OXIDE-CONTAINING FILM | | ANODE CURRENT COLLECTOR TEN-POINT HEIGHT OF ROUGHNESS PROFILE Rz (μm) | VOLUMETRIC CAPACITY (cm$^3$/g) | DISCHARGE CAPACITY RETENTION RATIO (%) |
|---|---|---|---|---|---|---|
|  |  | KIND | FORMING METHOD |  |  |  |
| EXAMPLE 13-1 | 6 | SiO$_2$ | LIQUID-PHASE DEPOSITION | 1 | 0.02 | 61 |
| EXAMPLE 13-2 |  |  |  | 1.5 |  | 80.1 |
| EXAMPLE 13-3 |  |  |  | 2.5 |  | 85.6 |
| EXAMPLE 2-5 |  |  |  | 3.5 |  | 90.9 |
| EXAMPLE 13-4 |  |  |  | 4.5 |  | 90.5 |
| EXAMPLE 13-5 |  |  |  | 5.5 |  | 90.4 |
| EXAMPLE 13-6 |  |  |  | 6.5 |  | 90.2 |
| EXAMPLE 13-7 |  |  |  | 7 |  | 71 |
| COMPARATIVE EXAMPLE 2 | 6 | SiO$_2$ | LIQUID-PHASE DEPOSITION | 3.5 | 0.3 | 51 |

As shown in Table 13, in Examples 13-1 to 13-7 in which the ten-point height of roughness profile Rz was different, as in the case of Example 2-5, the discharge capacity retention ratio was much higher than that in Comparative Example 2. In this case, as shown in Table 13 and FIG. 14, there was a tendency that as the ten-point height of roughness profile Rz increased, the discharge capacity retention ratio was increased, and then decreased, and when the ten-point height of roughness profile Rz was smaller than 1.5 μm or larger than 6.5 μm, the discharge capacity retention ratio was largely reduced. Therefore, it was confirmed that in the secondary battery according to the embodiment of the invention, even in the case where the ten-point height of roughness profile Rz of the surface of the anode current collector 54A was changed, the cycle characteristics were improved, and when the ten-point height of roughness profile Rz was within a range from 1.5 μm to 6.5 μm both inclusive, a higher effect was obtained.

Example 14-1

A secondary battery was formed by the same steps as those in Example 2-5, except that instead of EC, 4-fluoro-1,3-dioxolane-2-one (FEC) as a fluorinated carbonate (monofluoroethylene carbonate) was used as the solvent.

Example 14-2

A secondary battery was formed by the same steps as those in Example 2-5, except that as the solvent, 4,5-difluoro-1,3-dioxolane-2-one (DFEC) as a fluorinated carbonate (difluoroethylene carbonate) was added, and the composition (EC:DFEC:DEC) of a mixture solvent had a weight ratio of 25:5:70.

Examples 14-3, 14-4

Secondary batteries were formed by the same steps as those in Example 14-1, except that vinylene carbonate (VC: Example 14-3) or vinyl ethylene carbonate (VEC: Example 14-4) as a cyclic carbonate including an unsaturated bond was added to the electrolytic solution as the solvent. At that time, the content of VC or VEC in the electrolytic solution was 10 wt %.

Example 14-5

A secondary battery was formed by the same steps as those in Example 14-1, except that 1,3-propane sultone (PRS) as a sultone was added to the electrolytic solution as the solvent. At that time, the concentration of PRS in the electrolytic solution was 1 wt %.

Example 14-6

A secondary battery was formed by the same steps as those in Example 14-1, except that lithium tetrafluoroborate (LiBF$_4$) was added to the electrolytic solution as an electrolyte salt. At that time, the concentration of LiBF$_4$ in the electrolytic solution was 0.1 mol/kg.

When the cycle characteristics of the secondary batteries of Examples 14-1 to 14-6 were determined, results shown in Table 14 were obtained. In Table 14, the results of Example 2-5 and Comparative Example 2 are also shown.

At that time, in addition to the cycle characteristics, the swelling characteristics of the secondary batteries of Examples 2-5 and 14-5 were also determined. To determine the swelling characteristics, the secondary batteries were charged by the following steps to determine the swelling characteristics. At first, to stabilize the battery state of each of the secondary battery, one cycle of charge and discharge was performed in an atmosphere at 23° C., and the thickness of the secondary battery before the second cycle of charge was measured. Next, after the secondary battery was charged in the same atmosphere, the thickness of the secondary battery after the second cycle of charge was measured. Finally, the swelling rate (%)=[(thickness after charge−thickness before charge)/thickness before charge]× 100 was determined by calculation. At that time, charge conditions were the same as those in the case where the cycle characteristics were determined.

TABLE 14

Anode active material: silicon (electron beam evaporation)
Ten-point height of roughness profile Rz = 3.5 μm
Oxygen content in anode active material = 3 at %

| | ANODE | | | | | | | | | DISCHARGE | SWELL- |
|---|---|---|---|---|---|---|---|---|---|---|---|
| | ANODE ACTIVE MATERIAL LAYER | OXIDE-CONTAINING FILM | | VOLUMETRIC | ELECTROLYTIC SOLUTION | | | | | CAPACITY RETENTION | ING |
| | NUMBER | | FORMING | CAPACITY | SOLVENT (wt %) | | | | | RATION | RATE |
| | (LAYER) | KIND | METHOD | (cm³/g) | EC | FEC | DFEC | DEC | OTHERS | (%) | (%) |
| EXAMLPE 2-5 | 6 | SiO$_2$ | LIQUID-PHASE DEPOSITION | 0.02 | 50 | — | — | 50 | — | 90.9 | 2.95 |
| EXAMPLE 14-1 | | | | | — | 50 | — | 50 | | 91.2 | — |
| EXAMPLE 14-2 | | | | | 25 | — | 5 | 70 | | 91.8 | — |
| EXAMPLE 14-3 | | | | | — | 50 | — | 50 | VC | 91.9 | — |
| EXAMPLE 14-4 | | | | | | | | | VEC | 91.8 | — |
| EXAMPLE 14-5 | | | | | | | | | PRS | 91 | 0.38 |
| EXAMPLE 14-6 | | | | | | | | | LiBF$_4$ | 91 | — |
| COMPARATIVE EXAMPLE 2 | 6 | SiO$_2$ | LIQUID-PHASE DEPOSITION | 0.3 | 50 | — | — | 50 | — | 51 | — |

As shown in Table 14, in Examples 14-1 to 14-6 in which the composition of the solvent and the kind of the electrolyte salt were different, as in the case of Example 2-5, the discharge capacity retention ratio was much higher than that in Comparative Example 2. Therefore, it was confirmed that in the secondary battery according to the embodiment of the invention, even in the case where the composition of the solvent or the kind of the electrolyte salt was changed, the cycle characteristics were improved.

In particular, in Examples 14-1 and 14-2, the discharge capacity retention ratio was higher than that in Example 2-5. In this case, there was a tendency that in the case where the solvent included DFEC, the discharge capacity retention ratio was higher that in the case the solvent included FEC. Therefore, it was confirmed that when the solvent included a fluorinated carbonate, the cycle characteristics were further improved, and when difluoroethylene carbonate was used as the fluorinated carbonate, a higher effect than that in the case where monofluoroethylene carbonate was used was obtained.

Moreover, in Examples 14-3 to 14-6, the discharge capacity retention ratio was higher than that in Example 2-5. In this case, there was a tendency that when the solvent included VC or VEC, the discharge capacity retention ratio was higher than that in the case where the solvent included PRS or LiBF$_4$. Therefore, it was confirmed that when the cyclic carbonate including an unsaturated bond, a sultone or the electrolyte salt including boron and fluorine was included, the cycle characteristics were further improved, and when the cyclic carbonate including an unsaturated bond was used, a higher effect was obtained.

In Example 14-5 in which the solvent included PRS, the swelling rate was largely reduced, compared to Example 2-5 in which the solvent did not included PRS. Therefore, it was confirmed that in the secondary battery according to the embodiment of the invention, when the solvent included a sultone or the like, the swelling characteristics were improved.

Example 15-1

A secondary battery was formed by the same steps as those in Example 2-5, except that instead of the laminate film type secondary battery, a prismatic secondary battery shown in FIGS. 5 and 6 was formed by the following steps.

At first, after the cathode 21 and the anode 22 were formed, the cathode lead 24 made of aluminum and the anode lead 25 made of nickel were attached to the cathode current collector 21A and the anode current collector 22A by welding, respectively. Next, the cathode 21, the separator 23 and the anode 22 were laminated in this order, and were spirally wound in a longitudinal direction, and then molded into a flat shape, thereby the battery element 20 was formed. Then, after the battery element 20 was contained in the battery can 11 made of aluminum, the insulating plate 12 was arranged on the battery element 20. Next, after the cathode lead 24 and the anode lead 25 were welded to the cathode pin 15 and the battery can 11, respectively, the battery cover 13 was fixed in an open end of the battery can 11 by laser welding. Finally, the electrolytic solution was injected into the battery can 11 through the injected hole 19, and the injection hole 19 was filled with the sealing member 19A, thereby a prismatic battery was formed.

Example 15-2

A secondary battery was formed by the same steps as those in Example 15-1, except that instead of the battery can 11 made of aluminum, the battery can 11 made of iron was used.

When the cycle characteristics of the secondary batteries of Examples 15-1 and 15-2 were determined, results shown in Table 15 were obtained. In Table 15, the results in Example 2-5 and Comparative Example 2 are also shown.

TABLE 15

Anode active material: silicon (electron beam evaporation)
Ten-point height of roughness profile Rz = 3.5 μm
Oxygen content in anode active material = 3 at %

|  | BATTERY CONFIGURATION | ANODE ACTIVE MATERIAL LAYER NUMBER (LAYER) | OXIDE-CONTAINING FILM | | VOLUMETRIC CAPACITY ($cm^3/g$) | DISCHARGE CAPACITY RETENTION RATIO (%) |
|---|---|---|---|---|---|---|
|  |  |  | KIND | FORMING METHOD |  |  |
| EXAMPLE 2-5 | LAMINATE FILM | 6 | $SiO_2$ | LIQUID-PHASE DEPOSITION | 0.02 | 90.9 |
| EXAMPLE 15-1 | PRISMATIC (ALUMINUM) |  |  |  |  | 91.9 |
| EXAMPLE 15-2 | PRISMATIC (IRON) |  |  |  |  | 92.5 |
| COMPARATIVE EXAMPLE 2 | LAMINATE FILM | 6 | $SiO_2$ | LIQUID-PHASE DEPOSITION | 0.3 | 51 |

As shown in Table 15, in Examples 15-1 and 15-2 in which the battery configuration was different, as in the case of Example 2-5, the discharge capacity retention ratio was much higher than that in Comparative Example 2. In this case, the discharge capacity retention ratio was higher than that in Example 2-5, and there was a tendency that in the case where the battery can 11 was made of iron, the discharge capacity retention ratio was higher than that in the case where the battery can 11 was made of aluminum. Therefore, it was confirmed that in the secondary battery according to the embodiment of the invention, even in the case where the battery configuration was changed, the cycle characteristics were improved, and when the battery configuration had a prismatic type, the cycle characteristics were further improved, compared to the case where the battery configuration had a laminate film type, and in the case where the battery can 11 made of iron was used, a higher effect was obtained. Although descriptions are not given here referring to a specific example, in a prismatic secondary battery in which the package member was made of a metal material, the cycle characteristics and the swelling characteristics were further improved, compared to the laminate film type secondary battery, so it was obvious that in a cylindrical secondary battery in which the package member is made of a metal material, the same result was obtained.

Examples 16-1 to 16-4

Secondary batteries were formed by the same steps as those in Examples 2-1 to 2-9, except that the back-and-forth movement speed of the anode current collector 54A relative to the evaporation source was changed so that the volumetric capacity of the very small pore group per unit weight of silicon was 0.2 $cm^3/g$ (Example 16-1), 0.05 $cm^3/g$ (Example 16-2), 0.01 $cm^3/g$ (Example 16-3) or 0 $cm^3/g$ (Example 16-4). The volumetric capacity of the very small pore group per unit weight of silicon was determined by a value (the weight of silicon as the anode active material) determined by subtracting the weight of the anode current collector 54A from the total weight of the anode current collector 54A on which the anode active material was formed, and the value (the volumetric capacity of the very small pore group) of the amount of mercury intruded into pores with a diameter ranging from 3 nm to 20 nm both inclusive which was measured by a mercury porosimeter of Micromeritics (AutoPore 9500 series).

Comparative Example 16

A secondary battery was formed by the same steps as those in Comparative Example 2, except that the volumetric capacity of the very small pore group per unit weight of silicon was 0.3 $cm^3/g$.

When the cycle characteristics of the secondary batteries of Examples 16-1 to 16-4 and Comparative Example 16 were determined, results shown in Table 16 were obtained.

TABLE 16

Anode active material: silicon (electron beam evaporation)
Ten-point height of roughness profile Rz = 3.5 μm
Oxygen content in anode active material = 3 at %

|  | ANODE ACTIVE MATERIAL LAYER NUMBER (LAYER) | OXIDE-CONTAINING FILM | | VOLUMETRIC CAPACITY ($cm^3/g$) | DISCHARGE CAPACITY RETENTION RATIO (%) |
|---|---|---|---|---|---|
|  |  | KIND | FORMING METHOD |  |  |
| EXAMPLE 16-1 | 6 | $SiO_2$ | LIQUID-PHASE DEPOSITION | 0.2 | 83.2 |
| EXAMPLE 16-2 |  |  |  | 0.05 | 90.1 |
| EXAMPLE 16-3 |  |  |  | 0.01 | 92.2 |
| EXAMPLE 16-4 |  |  |  | 0 | 93.4 |
| COMPARATIVE EXAMPLE 16 | 6 | $SiO_2$ | LIQUID-PHASE DEPOSITION | 0.3 | 57.1 |

As shown in Table 16, in the case where the oxide-containing film was formed, in Examples 16-1 to 16-4 in which the volumetric capacity of the very small pore group per unit weight of silicon was 0.2 cm$^3$/g or less, the discharge capacity retention ratio was much higher than that in Comparative Example 16 in which the capacity was out of the range, and when the capacity was 0.05 cm$^3$/g or less, or 0 cm$^3$/g, the discharge capacity retention ratio became higher. In this case, in consideration of a difference between pore groups (the small pore group and the very small pore group), there was a tendency that in Examples 16-1 to 16-4 relating to the very small pore group, the discharge capacity retention ratio was higher than that in Examples 2-1, 2-4, 2-6 and 2-9 relating to the small pore group. The results showed that to reduce the surface area of the anode active material, the volumetric capacity of the very small pore group had a larger influence than the volumetric capacity of the small pore group. Therefore, it was confirmed that in the secondary battery according to the embodiment of the invention, in the case where the oxide-containing film was formed, when the volumetric capacity of the very small pore group per unit weight of silicon was 0.2 cm$^3$/g or less, the cycle characteristics were further improved. In this case, it was confirmed that when the volumetric capacity was 0.05 cm$^3$/g or less, or more specifically 0 cm$^3$/g, a higher effect was obtained.

Examples 17-1 to 17-4

Secondary batteries were formed by the same steps as those in Examples 6-1 to 6-6, except that the back-and-forth movement speed of the anode current collector 54A relative to the evaporation source was changed so that the volumetric capacity of the very small pore group per unit weight of silicon was 0.2 cm$^3$/g (Example 17-1), 0.05 cm$^3$/g (Example 17-2), 0.01 cm$^3$/g (Example 17-3) or 0 cm$^3$/g (Example 17-4).

Comparative Example 17

A secondary battery was formed by the same steps as those in Comparative Example 6, except that the volumetric capacity of the very small pore group per unit weight of silicon was 0.3 cm$^3$/g.

When the cycle characteristics of the secondary batteries of Examples 17-1 to 17-4 and Comparative Example 17 were determined, results shown in Table 17 were obtained.

As shown in Table 17, in the case where the metal material was formed, in Examples 17-1 to 17-4 in which the volumetric capacity of the very small pore group per unit weight of silicon was 0.2 cm$^3$/g or less, the discharge capacity retention ratio was much higher than that in Comparative Example 17 in which the capacity was out of the range, and when the volumetric capacity was 0.05 cm$^3$/g or less, or 0 cm$^3$/g, the discharge capacity retention ratio became higher. In this case, as in the case of the results shown in Table 16, there was a tendency that in Examples 17-1, 17-3 and 17-4 relating to the very small pore group, the discharge capacity retention ratio was higher than that in Examples 6-1, 6-3 and 6-6 relating to the small pore group. Therefore, it was confirmed that in the secondary battery according to the embodiment of the invention, in the case where the metal material was formed, when the volumetric capacity of the very small pore group per unit weight of silicon was 0.2 cm$^3$/g, the cycle characteristics were further improved. In this case, it was confirmed that when the volumetric capacity was 0.05 cm$^3$/g or less, or more specifically 0 cm$^3$/g, a higher effect was obtained.

It was obvious from the results shown in Tables 1 to 17 and FIGS. 11 to 14 that in the case where the anode active material included silicon and the small pore group (a pore group with a diameter ranging from 3 nm to 50 nm both inclusive), when the volumetric capacity of the small pore group per unit weight of silicon was 0.2 cm$^3$/g or less, independent of the conditions such as the number of layers of the anode active material or the composition of the anode active material, the cycle characteristics were improved.

Although the present invention is described referring to the embodiment and the examples, the invention is not limited to the embodiment and the examples, and may be variously modified. For example, in the above-described embodiment and the above-described examples, to set the volumetric capacity of the small pore group per unit weight of silicon within a range of 0.2 cm$^3$/g or less, the oxide-containing film or the metal material is included in pores as necessary; however, the invention is not limited to this. As long as the volumetric capacity of the small pore group per unit weight of silicon is 0.2 cm$^3$/g or less, any other filling material may be included in the pores. It is preferable that the filling material does not have a specific influence on the performance of the secondary battery.

In the above-described embodiment and the above-described materials, as the kind of the secondary battery, the lithium-ion secondary battery in which the capacity of the anode is represented based on the insertion and extraction of

TABLE 17

Anode active material: silicon (electron beam evaporation)
Ten-point height of roughness profile Rz = 3.5 μm
Oxygen content in anode active material = 3 at %

| | ANODE ACTIVE MATERIAL LAYER | METAL MATERIAL | | VOLUMETRIC | DISCHARGE CAPACITY RETENTION |
|---|---|---|---|---|---|
| | NUMBER (LAYER) | KIND | FORMING METHOD | CAPACITY (cm$^3$/g) | RATIO (%) |
| EXAMPLE 17-1 | 6 | Co | ELECTROLYTIC PLATING | 0.2 | 83.3 |
| EXAMPLE 17-2 | | | | 0.05 | 90 |
| EXAMPLE 17-3 | | | | 0.01 | 92.1 |
| EXAMPLE 17-4 | | | | 0 | 93.5 |
| COMPARATIVE EXAMPLE 17 | 6 | Co | ELECTROLYTIC PLATING | 0.3 | 57 | lithium is described; however, the invention is not limited to the lithium-ion secondary battery. The secondary battery of the invention is applicable to a secondary battery in which the charge capacity of an anode material capable of inserting and extracting lithium is smaller than the charge capacity of a cathode, thereby the capacity of the anode includes a capacity by insertion and extraction of lithium and a capacity by precipitation and dissolution of lithium, and is represented by the sum of them in the same manner.

In the above-described embodiment and the above-described examples, the case where the battery has a prismatic type, a cylindrical type or a laminate film type, and the case where the battery element has a spirally wound configuration are described as examples; however, the secondary battery of the invention is applicable to the case where a secondary battery has any other shape such as a coin type or a button type or the case where the battery element has any other configuration such as a laminate configuration in the same manner.

In the above-described embodiment and the above-described examples, the case where lithium is used as an electrode reactant is described; however, any other Group 1 element in the long form of the periodic table of the elements such as sodium (Na) or potassium (K), a Group 2 element in the long form of the periodic table of the elements such as magnesium (Mg) or calcium (Ca), or any other light metal such as aluminum may be used. The long form of the periodic table of the elements is represented by Revised Edition of IUPAC Inorganic Chemistry Nomenclature set forth by IUPAC (International Union of Pure and Applied Chemistry). Also in this case, as the anode active material, the anode material described in the above-described embodiment may be used.

In the above-described embodiment and the above-described examples, an appropriate range, which is derived from the results of the examples, of the volumetric capacity of the small pore group per unit weight of silicon in the anode or the secondary battery of the invention is described; however, the description does not exclude the possibility that the volumetric capacity of the small pore group per unit weight of silicon is out of the above-described range. More specifically, the above-described appropriate range is specifically a preferable range to obtain the effects of the invention, and as long as the effects of the invention are obtained, the volumetric capacity may be deviated from the above-described range to some extent. It is not limited to the above-described volumetric capacity, and the same holds for the volumetric capacity of the very small pore group per unit weight of silicon, the oxygen content in the anode active material, the ten-point height of roughness profile Rz of the surface of the anode current collector, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. A secondary battery comprising a cathode, an anode and an electrolytic solution, wherein:
the anode includes an anode current collector, and an anode active material layer on a surface of the anode current collector;
the anode active material layer includes active material comprising (a) silicon and (b) pores with diameters ranging from 3 nm to 50 nm; and
a volumetric capacity per unit of silicon of the pores with diameters distributed over a range from 3 nm to 50 nm is 0.2 cm$^3$/g or less as measured by mercury porosimetry using a mercury porosimeter.

2. The secondary battery according to claim 1, wherein the volumetric capacity per unit weight of silicon of the pores with diameters distributed over the range from 3 nm to 50 nm is 0.05 cm$^3$/g or less.

3. The secondary battery according to claim 1, wherein the volumetric capacity per unit weight of silicon of the pores with diameters distributed over the range from 3 nm to 50 nm is 0 cm$^3$/g.

4. The secondary battery according to claim 1, wherein:
a volumetric capacity per unit weight of silicon of those pores with diameters distributed over a range from 3 nm to 20 nm is 0.2 cm$^3$/g or less.

5. The secondary battery according to claim 1, wherein a volumetric capacity per unit of weight of silicon of those pores with diameters distributed over the range from 3 nm to 20 nm is 0.05 cm$^3$/g or less.

6. The secondary battery according to claim 1, wherein a volumetric capacity per unit of silicon of those pores of those pores with diameters distributed over the range from 3 nm to 20 nm is 0 cm$^3$/g.

7. The secondary battery according to claim 1, wherein the anode active material layer is comprised of a plurality of particles.

8. The secondary battery according to claim 7, wherein the anode active material layer has a multilayer configuration.

9. The secondary battery according to claim 1, wherein the anode active material layer is formed by a vapor-phase method.

10. The secondary battery according to claim 1, wherein the anode active material layer includes oxygen, and a content of the oxygen in the anode active material layer is within a range from 3 at % to 40 at %.

11. The secondary battery according to claim 1, wherein the anode active material layer includes at least one metal element selected from the group consisting of iron, cobalt, nickel, chromium, titanium, and molybdenum.

12. The secondary battery according to claim 1, wherein the anode active material layer includes an oxygen-containing region extending in a thickness direction of the anode active material layer, and the oxygen content in the oxygen-containing region is higher than the oxygen content in a region other than the oxygen-containing region.

13. The secondary battery according to claim 1, wherein a ten-point height of a roughness profile Rz of the surface of the anode current collector is within a range from and including 1.5 μm to 6.5 μm.

14. The secondary battery according to claim 1, wherein the electrolytic solution includes a solvent including a fluorinated carbonate.

15. The secondary battery according to claim 14, wherein the fluorinated carbonate is difluoroethylene carbonate.

16. The secondary battery according to claim 1, wherein the electrolytic solution includes an electrolyte salt including boron and fluorine.

17. The secondary battery according to claim 16, wherein the electrolyte salt is lithium tetrafluoroborate.

18. The secondary battery according to claim 1, wherein the cathode, the anode and the electrolytic solution are contained in a cylindrical or prismatic package member.

19. The secondary battery according to claim 18, wherein the package member includes iron or an iron alloy.

20. An anode comprising an anode current collector, and an anode active material layer on the anode current collector, wherein:

the anode active material layer includes active material comprising (a) silicon and (b) pores with diameters ranging from 3 nm to 50 nm; and a volumetric capacity per unit of silicon of the pores with diameters distributed over a range from 3 nm to 50 nm is 0.2 cm$^3$/g or less as measured by mercury porosimetry using a mercury porosimeter.

* * * * *